United States Patent
Cui et al.

(10) Patent No.: US 12,114,213 B2
(45) Date of Patent: Oct. 8, 2024

(54) DEVICE, SYSTEM AND METHOD FOR HANDOVER WITH SIMULTANEOUS UE TRANSMISSION BEAMS

(71) Applicant: Apple Inc., Cupertino, CA (US)

(72) Inventors: Jie Cui, San Jose, CA (US); Zhibin Yu, Unterhacing (DE); Yang Tang, San Jose, CA (US); Qiming Li, Beijing (CN); Qing Xu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 17/593,804

(22) PCT Filed: May 8, 2020

(86) PCT No.: PCT/US2020/032215
§ 371 (c)(1),
(2) Date: Sep. 24, 2021

(87) PCT Pub. No.: WO2020/231858
PCT Pub. Date: Nov. 19, 2020

(65) Prior Publication Data
US 2022/0182898 A1    Jun. 9, 2022

Related U.S. Application Data

(60) Provisional application No. 62/846,249, filed on May 10, 2019.

(51) Int. Cl.
*H04W 36/00* (2009.01)
*H04L 5/00* (2006.01)
(Continued)

(52) U.S. Cl.
CPC ....... *H04W 36/0072* (2013.01); *H04L 5/0051* (2013.01); *H04W 36/06* (2013.01);
(Continued)

(58) Field of Classification Search
CPC . H04W 36/0072; H04W 36/06; H04W 36/08; H04W 52/367; H04W 52/42; H04L 5/0051
See application file for complete search history.

(56) References Cited

U.S. PATENT DOCUMENTS

2019/0132851 A1   5/2019   Davydov et al.
2019/0190669 A1*  6/2019   Park ................... H04W 56/001
(Continued)

FOREIGN PATENT DOCUMENTS

CN   108260133 A   7/2018
EP   1226724       7/2002
(Continued)

*Primary Examiner* — Justin Y Lee
(74) *Attorney, Agent, or Firm* — Fay Kaplun & Marcin, LLP

(57) ABSTRACT

A user equipment (UE) in a wireless network including a first next generation NodeB (gNB) and a second gNB for communicating with the UE performs operations. The operations include determining to transmit a first transmission (Tx) stream and a second Tx stream simultaneously to the first gNB and the second gNB for handing over communication with the UE from a first cell to a second cell, wherein the first gNB is a serving gNB in the first cell and the second gNB is a handover target gNB in the second cell and simultaneously transmitting within a same antenna panel of the UE the first transmission stream to the first gNB using a first polarization and the second transmission stream to the second gNB using a second polarization different from the first polarization.

19 Claims, 15 Drawing Sheets

(51) Int. Cl.
*H04W 36/06* (2009.01)
*H04W 36/08* (2009.01)
*H04W 52/36* (2009.01)
*H04W 52/42* (2009.01)

(52) U.S. Cl.
CPC ......... *H04W 36/08* (2013.01); *H04W 52/367* (2013.01); *H04W 52/42* (2013.01)

(56) References Cited

U.S. PATENT DOCUMENTS

| | | | |
|---|---|---|---|
| 2020/0107327 A1* | 4/2020 | Wang | H04W 72/044 |
| 2020/0107341 A1* | 4/2020 | Zhang | H04W 72/23 |
| 2021/0274488 A1* | 9/2021 | Yamamoto | H04W 72/23 |

FOREIGN PATENT DOCUMENTS

| | | |
|---|---|---|
| KR | 101549035 B1 | 9/2015 |
| WO | 2018/044693 A1 | 3/2018 |
| WO | 2018/203653 A1 | 11/2018 |
| WO | 2018/232294 | 12/2018 |

\* cited by examiner

DEVICE, SYSTEM AND METHOD FOR HANDOVER WITH SIMULTANEOUS UE TRANSMISSION BEAMS

PRIORITY CLAIM

The present disclosure claims priority to U.S. Prov. Patent Appln. Ser. No. 62/846,249 filed May 10, 2019 and entitled "HANDOVER FURTHER ENHANCEMENT WITH SIMULTANEOUS UE TRANSMISSION BEAMS," the disclosure of which is incorporated herein by reference.

BACKGROUND

A user equipment (UE) may establish a connection to one or more different networks or types of networks. The UE may access services available via the network connection by communicating with a base station of the corresponding network. In some radio access networks (RAN), such as the 5G New Radio (NR) RAN, the UE may propagate a signal from an antenna module over a high frequency band by beamforming. Transmitting a beam over a high frequency band may provide an increase in bandwidth and an increase in the data rate compared to legacy approaches. However, interruptions may occur during handover causing a reduction in throughput for the whole network. In FR2 the UE may use different Rx or Tx beams for the serving cell and the target cell during handover and it may be difficult to maintain connections with the serving cell and the target cell simultaneously without interruption.

SUMMARY

Some exemplary embodiments relate to a method performed by a user equipment (UE) in a wireless network including a first next generation NodeB (gNB) and a second gNB for communicating with the UE. The method includes determining to transmit a first transmission (Tx) stream and a second Tx stream simultaneously to the first gNB and the second gNB for handing over communication with the UE from a first cell to a second cell, wherein the first gNB is a serving gNB in the first cell and the second gNB is a handover target gNB in the second cell and simultaneously transmitting within a same antenna panel of the UE the first transmission stream to the first gNB using a first polarization and the second transmission stream to the second gNB using a second polarization different from the first polarization.

Other exemplary embodiments relate to a user equipment (UE) having a plurality of antenna panels, each antenna panel comprising a plurality of antenna elements. The UE also including a processor configured to determine to transmit a first transmission (Tx) stream and a second Tx stream simultaneously to a first next generation NodeB (gNB) and a second gNB for handing over communication with the UE from a first cell to a second cell, wherein the first gNB is a serving gNB in the first cell and the second gNB is a handover target gNB in the second cell. The UE further including a transceiver configured to simultaneously transmit via a same antenna panel of the UE the first transmission stream to the first gNB using a first TX polarization and the second transmission stream to the second gNB using a second TX polarization different from the first polarization.

Still further exemplary embodiments relate to a method performed by a first next generation NodeB (gNB) in a first cell for communicating with a user equipment (UE) in a wireless network including the UE and a second gNB in a second cell for communicating with the UE. The method includes allocating a Downlink Control Information (DCI) format 0_1 for triggering a Physical Uplink Shared Channel (PUSCH) transmission by the UE, triggering the PUSCH transmission by the UE and restricting an uplink (UL) channel scheduling by triggering the PUSCH transmission with a single port.

DETAILED DESCRIPTION

Figure 1:
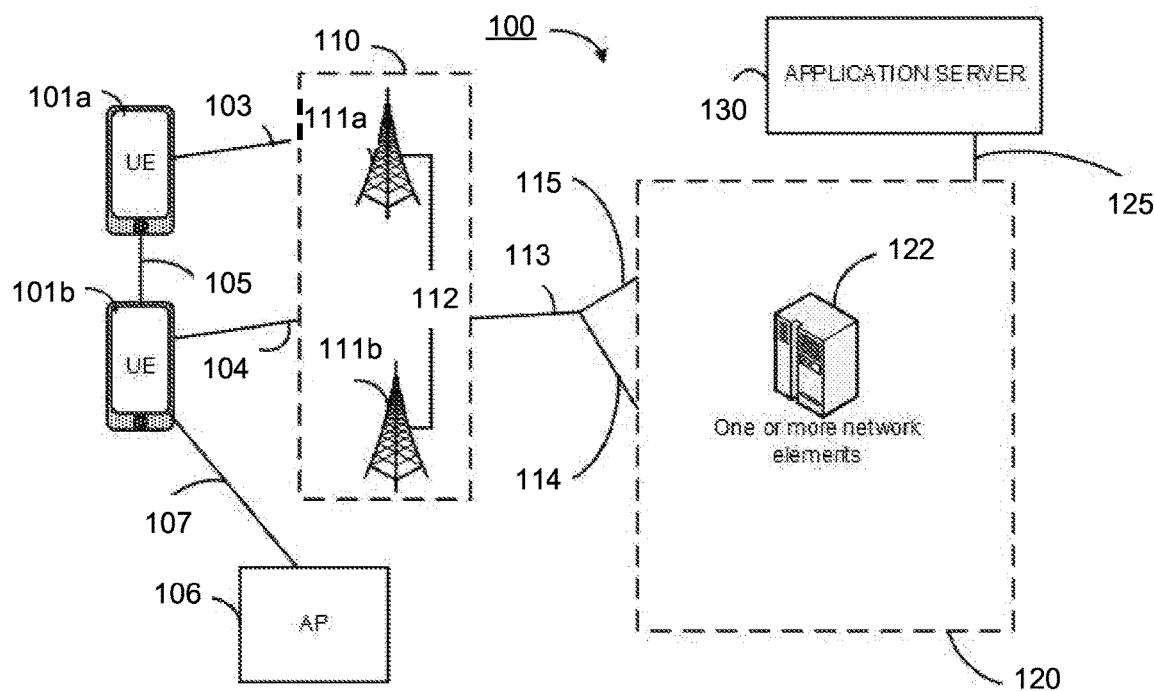
FIG. 1 illustrates an example architecture of a system of a network in accordance with various exemplary embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The exemplary embodiments may be further understood with reference to the following description and the related appended drawings and slides, wherein like elements are provided with the same reference numerals. The exemplary embodiments are described with regard to beamforming which is an antenna technique that is utilized to propagate a directional signal over a mmWave frequency band. Throughout this description, the term "beam" may refer to a beamformed signal. However, reference to a beam is merely exemplary. Different networks may refer to a signal propagated over mmWave frequencies by a different name. Beamforming will be described in further detail below with regard to FIGS. 11a-b. The exemplary embodiments describe devices, systems and methods for mitigating interference issues and related issues that may occur during simultaneous transmission (Tx) and/or reception (Rx) of beamformed signals to a plurality of network cells during handover from a source cell to a target cell. The exemplary embodiments will be described in further detail below with respect to FIGS. 11-15.

System Architecture

FIG. 1 illustrates an example architecture of a system 100 of a network in accordance with various exemplary embodiments. The following description is provided for an example system 100 that operates in conjunction with the 5G NR system standards as provided by 3GPP technical specifications. However, the exemplary embodiments are not limited in this regard and the described embodiments may apply to other networks that benefit from the principles described herein, such as legacy (e.g. LTE) 3GPP systems, future 3GPP systems (e.g., Sixth Generation (6G) systems), IEEE 802.16 protocols (e.g., WMAN, WiMAX, etc.), or the like.

As shown in FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections (within the Internet infrastructure), with short-lived connections. The IoT UEs may execute background applications (e.g., keep-alive messages, status updates, etc.) to facilitate the connections of the IoT network.

The UEs 101 may be configured to connect, e.g., communicatively couple, with a radio access network (RAN) 110. In some embodiments, the RAN 110 may be a 5G NR RAN, while in other embodiments the RAN 110 may be an E-UTRAN or a legacy RAN, such as a UTRAN or GERAN. As used herein, the term "5G NR RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a Proximity Services (ProSe) interface 105. The ProSe interface 105 may alternatively be referred to as a SL interface 105 and may comprise one or more logical channels, including but not limited to a PSCCH, a PSSCH, a PSDCH, and a PSBCH.

The UE 101b is further configured to access a WLAN node 106 (also referred to as "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the WLAN node 106 is shown to be connected to the Internet without connecting to the core network of the wireless system (described in further detail below). In various embodiments, the UE 101b, RAN 110, and WLAN node 106 may be configured to utilize LTE-WLAN aggregation (LWA) operation and/or LTE/WLAN Radio Level Integration with IPsec Tunnel (LWIP) operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 includes one or more RAN nodes 111a and 111b (collectively referred to as "RAN nodes 11F" or "RAN node 11F") that enable the connections 103 and 104. As used herein, the terms "access node," "access point," or the like may describe equipment that provides the radio baseband functions for data and/or voice connectivity between a network and one or more users. These access nodes can be referred to as base stations (BSs), next generation NodeBs (gNBs), RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "5G NR RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., RFEM 215 in FIG. 2), and the gNB-CU may be operated by a server (not shown) that is located in the RAN 110 or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 820 of FIG. 8) via a 5G NR interface.

In V2X scenarios one or more of the RAN nodes 111 may be or act as Road Side Units (RSUs). The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some exemplary embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band or other unlicensed bands.

To operate in the unlicensed spectrum, the UEs 101 and the RAN nodes 111 may operate using LAA, eLAA, feLAA or NR-U mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

Listen before talk (LBT) is a mechanism whereby equipment (for example, UEs 101, RAN nodes 111, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA (licensed assisted access) networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, WLAN node 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system (e.g., when CN 120 is an EPC 720 as in FIG. 7), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs. For example, the X2-U may provide specific sequence number information for user data transferred from a MeNB to an SeNB; information about successful in sequence delivery of PDCP protocol data units (PDUs) to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the CN 120.

In embodiments, the CN 120 may be a 5GC (referred to as "5GC 120" or the like), and the RAN 110 may be connected with the CN 120 via 5G NR interface 113. In embodiments, the 5G NR interface 113 may be split into two parts, a 5G NR user plane (NG-U) interface 114, which carries traffic data between the RAN nodes 111 and a UPF, and the S1 control plane (NG-C) interface 115, which is a signaling interface between the RAN nodes 111 and the AMF 821. Embodiments where the CN 120 is a 5GC 120 are discussed in more detail with regard to FIG. 8.

In embodiments, the CN 120 may be a 5G CN (referred to as "5GC 120" or the like), while in other embodiments, the CN 120 may be an EPC). Where the CN 120 is an evolved packet core (EPC) (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and the MME.

Figure 7:
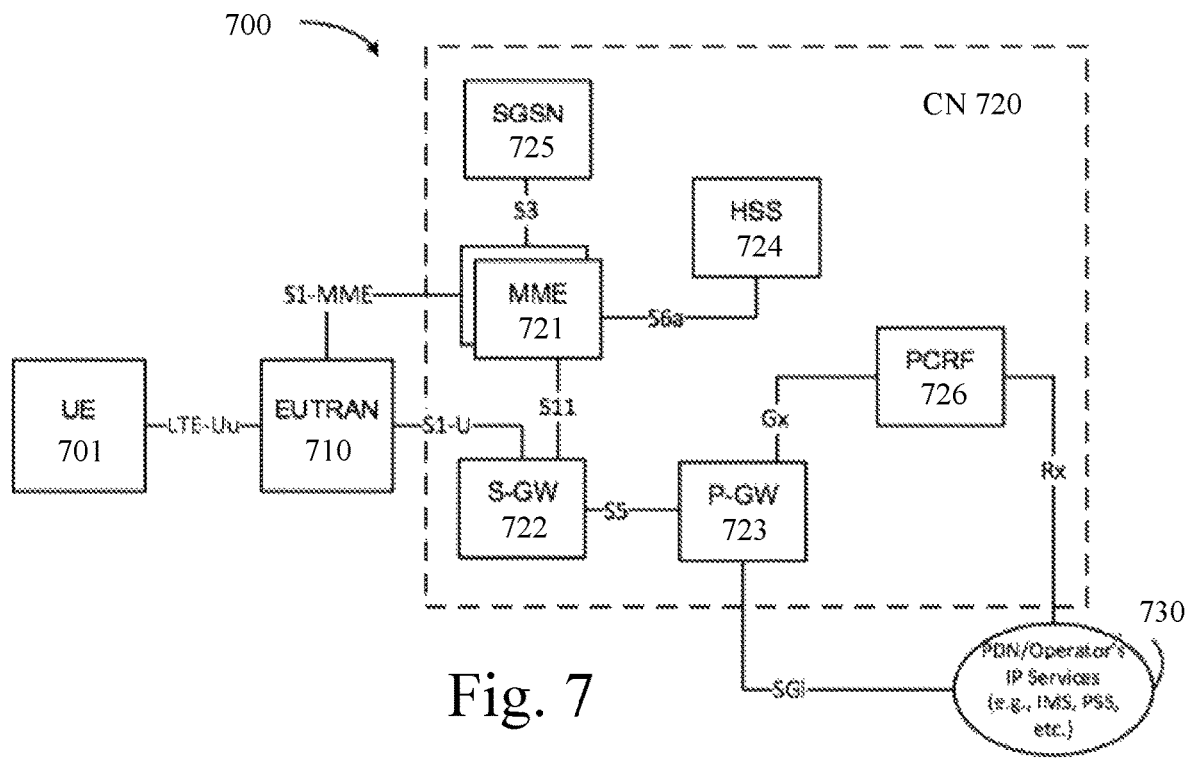
FIG. 7 illustrates an example architecture of a system including a first core network in accordance with various embodiments.

FIG. 7 illustrates an example architecture of a system 700 including a first CN 720, in accordance with various embodiments. In this example, system 700 may implement the LTE standard wherein the CN 720 is an EPC 720 that corresponds with CN 120 of FIG. 1. Additionally, the UE 701 may be the same or similar as the UEs 101 of FIG. 1, and the E-UTRAN 710 may be a RAN that is the same or similar to the RAN 110 of FIG. 1, and which may include RAN nodes 111 discussed previously. The CN 720 may comprise mobile management entities (MMEs) 721, a serving gateway (S-GW) 722, a PDN gateway (P-GW) 723, a home subscriber server (HSS) 724, and a serving GPRS support node (SGSN) 725.

The MMEs 721 may be similar in function to the control plane of legacy SGSN and may implement MM functions to keep track of the current location of a UE 701. The MMEs 721 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 701, provide user identity confidentiality, and/or perform other like services to users/subscribers. Each UE 701 and the MME 721 may include an MM or EMM sublayer, and an MM context may be established in the UE 701 and the MME 721 when an attach procedure is successfully completed. The MM context may be a data structure or database object that stores MM-related information of the UE 701. The MMEs 721 may be coupled with the HSS 724 via an S6a reference point, coupled with the SGSN 725 via an S3 reference point, and coupled with the S-GW 722 via an S11 reference point.

The SGSN 725 may be a node that serves the UE 701 by tracking the location of an individual UE 701 and performing security functions. In addition, the SGSN 725 may perform Inter-EPC node signaling for mobility between 2G/3G and E-UTRAN 3GPP access networks; PDN and S-GW selection as specified by the MMEs 721; handling of UE 701 time zone functions as specified by the MMEs 721; and MME selection for handovers to E-UTRAN 3GPP access network. The S3 reference point between the MMEs 721 and the SGSN 725 may enable user and bearer information exchange for inter-3GPP access network mobility in idle and/or active states.

The HSS 724 may comprise a database for network users, including subscription-related information to support the network entities' handling of communication sessions. The EPC 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc. An S6a reference point between the HSS 724 and the MMEs 721 may enable transfer of subscription and authentication data for authenticating/authorizing user access to the EPC 720 between HSS 724 and the MMEs 721.

The S-GW 722 may terminate the S1 interface 113 ("S1-U" in FIG. 7) toward the RAN 710, and routes data packets between the RAN 710 and the EPC 720. In addition, the S-GW 722 may be a local mobility anchor point for inter-RAN node handovers and also may provide an anchor for inter-3GPP mobility. Other responsibilities may include lawful intercept, charging, and some policy enforcement. The S11 reference point between the S-GW 722 and the MMEs 721 may provide a control plane between the MMEs 721 and the S-GW 722. The S-GW 722 may be coupled with the P-GW 723 via an S5 reference point.

The P-GW 723 may terminate an SGi interface toward a PDN 730. The P-GW 723 may route data packets between the EPC 720 and external networks such as a network including the application server 130 (alternatively referred to as an "AF") via an IP interface 125 (see e.g., FIG. 1). In embodiments, the P-GW 723 may be communicatively coupled to an application server (application server 130 of FIG. 1 or PDN 730 in FIG. 7) via an IP communications interface 125 (see, e.g., FIG. 1). The S5 reference point between the P-GW 723 and the S-GW 722 may provide user plane tunneling and tunnel management between the P-GW 723 and the S-GW 722. The S5 reference point may also be used for S-GW 722 relocation due to UE 701 mobility and if the S-GW 722 needs to connect to a non-collocated P-GW 723 for the required PDN connectivity. The P-GW 723 may further include a node for policy enforcement and charging data collection (e.g., PCEF (not shown)). Additionally, the SGi reference point between the P-GW 723 and the packet data network (PDN) 730 may be an operator external public, a private PDN, or an intra operator packet data network, for example, for provision of IMS services. The P-GW 723 may be coupled with a PCRF 726 via a Gx reference point.

The PCRF 726 is the policy and charging control element of the EPC 720. In a non-roaming scenario, there may be a single PCRF 726 in the Home Public Land Mobile Network (HPLMN) associated with a UE 701's Internet Protocol Connectivity Access Network (IP-CAN) session. In a roaming scenario with local breakout of traffic, there may be two PCRFs associated with a UE 701's IP-CAN session, a Home PCRF (H-PCRF) within an HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate QoS and charging parameters. The PCRF 726 may provision this rule into a PCEF (not shown) with the appropriate TFT and QCI, which commences the QoS and charging as specified by the application server 730. The Gx reference point between the PCRF 726 and the P-GW 723 may allow for the transfer of QoS policy and charging rules from the PCRF 726 to PCEF in the P-GW 723. An Rx reference point may reside between the PDN 730 (or "AF 730") and the PCRF 726.

Figure 8:
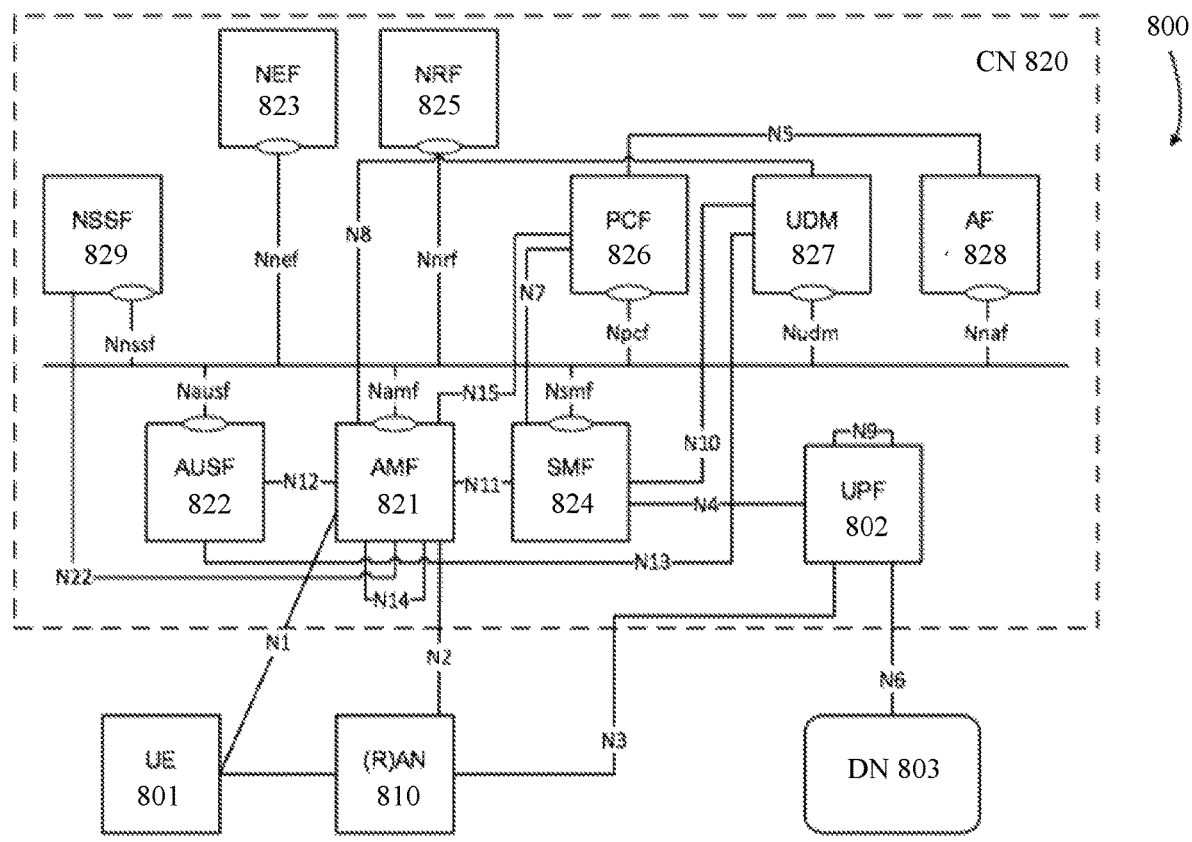
FIG. 8 illustrates an architecture of a system including a second core network in accordance with various embodiments.

FIG. 8 illustrates an architecture of a system 800 including a second CN 820 in accordance with various embodiments. The system 800 is shown to include a UE 801, which may be the same or similar to the UEs 101 and UE 701 discussed previously; a (R)AN 810, which may be the same or similar to the RAN 110 and RAN 710 discussed previously, and which may include RAN nodes 111 discussed previously; and a data network (DN) 803, which may be, for example, operator services, Internet access or 3rd party services; and a 5GC 820. The 5GC 820 may include an authentication server function (AUSF) 822; an access and mobility management function (AMF) 821; a session management function (SMF) 824; a network exposure function (NEF) 823; a policy control function (PCF) 826; an NF repository function (NRF) 825; a unified data management (UDM) 827; an application function (AF) 828; a user plane function (UPF) 802; and a network slice selection function (NSSF) 829.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 802 may include an uplink classifier to support routing traffic flows to a data network. The DN 803 may represent various network operator services, Internet access, or third party services. DN 803 may include, or be similar to, application server 130 discussed previously. The UPF 802 may interact with the SMF 824 via an N4 reference point between the SMF 824 and the UPF 802.

The AUSF 822 may store data for authentication of UE 801 and handle authentication-related functionality. The AUSF 822 may facilitate a common authentication framework for various access types. The AUSF 822 may communicate with the AMF 821 via an N12 reference point between the AMF 821 and the AUSF 822; and may communicate with the UDM 827 via an N13 reference point between the UDM 827 and the AUSF 822. Additionally, the AUSF 822 may exhibit an Nausf service-based interface.

The AMF 821 may be responsible for registration management (e.g., for registering UE 801, etc.), connection management, reachability management, mobility management, and lawful interception of AMF-related events, and access authentication and authorization. The AMF 821 may be a termination point for an N11 reference point between the AMF 821 and the SMF 824. The AMF 821 may provide transport for SM messages between the UE 801 and the SMF 824, and act as a transparent proxy for routing SM messages. AMF 821 may also provide transport for SMS messages between UE 801 and an SMSF (not shown by FIG. 8). AMF 821 may act as SEAF, which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a SCM function, which receives a key from the SEA that it uses to derive access-network specific keys. Furthermore, AMF 821 may be a termination point of a RAN CP interface, which may include or be an N2 reference point between the (R)AN 810 and the AMF 821; and the AMF 821 may be a termination point of NAS (N1) signaling and perform NAS ciphering and integrity protection.

The AMF 821 may also support NAS signaling with a UE 801 over an N3 IWF interface. The N3IWF may be used to provide access to untrusted entities. N3IWF may be a termination point for the N2 interface between the (R)AN 810 and the AMF 821 for the control plane and may be a termination point for the N3 reference point between the (R)AN 810 and the UPF 802 for the user plane. As such, the AMF 821 may handle N2 signaling from the SMF 824 and the AMF 821 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 801 and AMF 821 via an N1 reference point between the UE 801 and the AMF 821, and relay uplink and downlink user-plane packets between the UE 801 and UPF 802. The N3IWF also provides mechanisms for IPsec tunnel establishment with the UE 801. The AMF 821 may exhibit an Namf service-based interface and may be a termination point for an N14 reference point between two AMFs 821 and an N17 reference point between the AMF 821 and a 5G-EIR (not shown by FIG. 8).

The UE 801 may need to register with the AMF 821 in order to receive network services. RM is used to register or deregister the UE 801 with the network (e.g., AMF 821), and establish a UE context in the network (e.g., AMF 821). The UE 801 may operate in an RM-REGISTERED state or an RM-DEREGISTERED state. In the RM-DEREGISTERED state, the UE 801 is not registered with the network, and the UE context in AMF 821 holds no valid location or routing information for the UE 801 so the UE 801 is not reachable by the AMF 821. In the RM-REGISTERED state, the UE 801 is registered with the network, and the UE context in AMF 821 may hold a valid location or routing information for the UE 801 so the UE 801 is reachable by the AMF 821. In the RM-REGISTERED state, the UE 801 may perform mobility Registration Update procedures, perform periodic Registration Update procedures triggered by expiration of the periodic update timer (e.g., to notify the network that the UE 801 is still active), and perform a Registration Update procedure to update UE capability information or to re-negotiate protocol parameters with the network, among others.

The AMF 821 may store one or more RM contexts for the UE 801, where each RM context is associated with a specific access to the network. The RM context may be a data structure, database object, etc. that indicates or stores, inter alia, a registration state per access type and the periodic update timer. The AMF 821 may also store a 5GC MM context that may be the same or similar to the (E)MM context discussed previously. In various embodiments, the AMF 821 may store a CE mode B Restriction parameter of the UE 801 in an associated MM context or RM context. The AMF 821 may also derive the value, when needed, from the UE's usage setting parameter already stored in the UE context (and/or MM/RM context).

Connection management (CM) may be used to establish and release a signaling connection between the UE 801 and the AMF 821 over the N1 interface. The signaling connection is used to enable NAS signaling exchange between the UE 801 and the CN 820 and comprises both the signaling connection between the UE and the AN (e.g., RRC connection or UE-N3IWF connection for non-3GPP access) and the N2 connection for the UE 801 between the AN (e.g., RAN 810) and the AMF 821. The UE 801 may operate in one of two CM states, CM-IDLE mode or CM-CONNECTED mode. When the UE 801 is operating in the CM-IDLE state/mode, the UE 801 may have no NAS signaling connection established with the AMF 821 over the N1 interface, and there may be (R)AN 810 signaling connection (e.g., N2 and/or N3 connections) for the UE 801. When the UE 801 is operating in the CM-CONNECTED state/mode, the UE 801 may have an established NAS signaling connection with the AMF 821 over the N1 interface, and there may be a (R)AN 810 signaling connection (e.g., N2 and/or N3 connections) for the UE 801. Establishment of an N2 connection between the (R)AN 810 and the AMF 821 may cause the UE 801 to transition from CM-IDLE mode to CM-CONNECTED mode, and the UE 801 may transition from the CM-CONNECTED mode to the CM-IDLE mode when N2 signaling between the (R)AN 810 and the AMF 821 is released.

The SMF 824 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 801 and a data network (DN) 803 identified by a Data Network Name (DNN). PDU sessions may be established upon UE 801 request, modified upon UE 801 and 5GC 820 request, and released upon UE 801 and 5GC 820 request using NAS SM signaling exchanged over the N1 reference point between the UE 801 and the SMF 824. Upon request from an application server, the 5GC 820 may trigger a specific application in the UE 801. In response to receipt of the trigger message, the UE 801 may pass the trigger message (or relevant parts/information of the trigger message) to one or more identified applications in the UE 801. The identified application(s) in the UE 801 may establish a PDU session to a specific DNN. The SMF 824 may check whether the UE 801 requests are compliant with user subscription information associated with the UE 801. In this regard, the SMF 824 may retrieve and/or request to receive update notifications on SMF 824 level subscription data from the UDM 827.

The SMF 824 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 824 may be included in the system 800, which may be between another SMF 824 in a visited network and the SMF 824 in the home network in roaming scenarios. Additionally, the SMF 824 may exhibit the Nsmf service-based interface.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using standardized interfaces. The stored information can then be re-exposed by the NEF 823 to other NFs and AFs, and/or used for other purposes such as analytics. Additionally, the NEF 823 may exhibit an Nnef service-based interface.

The NRF 825 may support service discovery functions, receive NF discovery requests from NF instances, and provide the information of the discovered NF instances to the NF instances. NRF 825 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 825 may exhibit the Nnrf service-based interface.

The PCF 826 may provide policy rules to control plane function(s) to enforce them and may also support unified policy framework to govern network behavior. The PCF 826 may also implement an FE to access subscription information relevant for policy decisions in a UDR of the UDM 827. The PCF 826 may communicate with the AMF 821 via an N15 reference point between the PCF 826 and the AMF 821, which may include a PCF 826 in a visited network and the AMF 821 in case of roaming scenarios. The PCF 826 may communicate with the AF 828 via an N5 reference point between the PCF 826 and the AF 828; and with the SMF 824 via an N7 reference point between the PCF 826 and the SMF 824. The system 800 and/or CN 820 may also include an N24 reference point between the PCF 826 (in the home network) and a PCF 826 in a visited network. Additionally, the PCF 826 may exhibit a Npcf service-based interface.

The UDM 827 may handle subscription-related information to support the network entities' handling of communication sessions and may store subscription data of UE 801. For example, subscription data may be communicated between the UDM 827 and the AMF 821 via an N8 reference point between the UDM 827 and the AMF 821. The UDM 827 may include two parts, an application FE and a UDR (the FE and UDR are not shown by FIG. 8). The UDR may store subscription data and policy data for the UDM 827 and the PCF 826, and/or structured data for exposure and application data (including PFDs for application detection, application request information for multiple UEs 801) for the NEF 823. The Nudr service-based interface may be exhibited by the UDR 221 to allow the UDM 827, PCF 826, and NEF 823 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 824 via an N10 reference point between the UDM 827 and the SMF 824. UDM 827 may also support SMS management, wherein an SMS-FE implements the similar application logic as discussed previously. Additionally, the UDM 827 may exhibit the Nudm service-based interface.

The AF 828 may provide application influence on traffic routing, provide access to the NCE, and interact with the policy framework for policy control. The NCE may be a mechanism that allows the 5GC 820 and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs. Additionally, the AF 828 may exhibit an Naf service-based interface.

The NSSF 829 may select a set of network slice instances serving the UE 801. The NSSF 829 may also determine allowed NSSAI and the mapping to the subscribed S-NSSAIs, if needed. The NSSF 829 may also determine the AMF set to be used to serve the UE 801, or a list of candidate AMF(s) 821 based on a suitable configuration and possibly by querying the NRF 825. The selection of a set of network slice instances for the UE 801 may be triggered by the AMF 821 with which the UE 801 is registered by interacting with the NSSF 829, which may lead to a change of AMF 821. The NSSF 829 may interact with the AMF 821 via an N22 reference point between AMF 821 and NSSF 829; and may communicate with another NSSF 829 in a visited network via an N31 reference point (not shown by FIG. 8). Additionally, the NSSF 829 may exhibit an Nnssf service-based interface.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for a notification procedure that the UE 801 is available for SMS transfer (e.g., set a UE not reachable flag, and notifying UDM 827 when UE 801 is available for SMS).

The CN 120 may also include other elements that are not shown by FIG. 8, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 8). Individual NFs may share a UDSF for storing their respective unstructured data or individual NFs may each have their own UDSF located at or near the individual NFs. Additionally, the UDSF may exhibit an Nudsf service-based interface (not shown by FIG. 8). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 8 for clarity. In one example, the CN 820 may include an Nx interface, which is an inter-CN interface between the MME (e.g., MME 721) and the AMF 821 in order to enable interworking between CN 820 and CN 720. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 9:
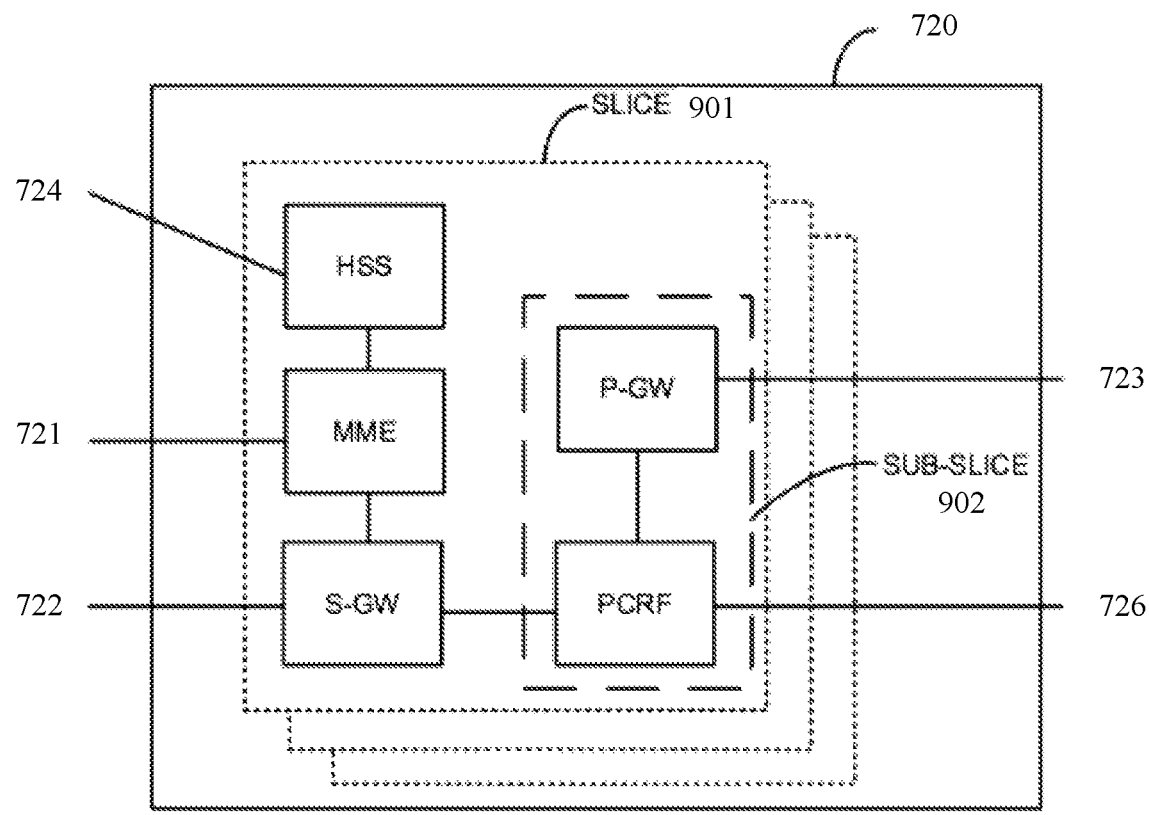
FIG. 9 illustrates components of a core network in accordance with various embodiments.

FIG. 9 illustrates components of a core network in accordance with various embodiments. The components of the CN 720 may be implemented in one physical node or separate physical nodes including components to read and execute instructions from a machine-readable or computer-readable medium (e.g., a non-transitory machine-readable storage medium). In embodiments, the components of CN 820 may be implemented in a same or similar manner as discussed herein with regard to the components of CN 720. In some embodiments, NFV is utilized to virtualize any or all of the above-described network node functions via executable instructions stored in one or more computer-readable storage mediums (described in further detail below). A logical instantiation of the CN 720 may be referred to as a network slice 901, and individual logical instantiations of the CN 720 may provide specific network capabilities and network characteristics. A logical instantiation of a portion of the CN 720 may be referred to as a network sub-slice 902 (e.g., the network sub-slice 902 is shown to include the P-GW 723 and the PCRF 726).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 8), a network slice always comprises a RAN part and a CN part. The support of network slicing relies on the principle that traffic for different slices is handled by different PDU sessions. The network can realize the different network slices by scheduling and also by providing different L1/L2 configurations. The UE 801 provides assistance information for network slice selection in an appropriate RRC message, if it has been provided by NAS. While the network can support large number of slices, the UE need not support more than 8 slices simultaneously.

A network slice may include the CN 820 control plane and user plane NFs, NG-RANs 810 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 801 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 821 instance serving an individual UE 801 may belong to each of the network slice instances serving that UE.

Network slicing in the NG-RAN 810 involves RAN slice awareness. RAN slice awareness includes differentiated handling of traffic for different network slices, which have been pre-configured. Slice awareness in the NG-RAN 810 is introduced at the PDU session level by indicating the S-NSSAI corresponding to a PDU session in all signaling that includes PDU session resource information. How the NG-RAN 810 supports the slice enabling in terms of NG-RAN functions (e.g., the set of network functions that comprise each slice) is implementation dependent. The NG-RAN 810 selects the RAN part of the network slice using assistance information provided by the UE 801 or the 5GC 820, which unambiguously identifies one or more of the pre-configured network slices in the PLMN. The NG-RAN 810 also supports resource management and policy enforcement between slices as per SLAs. A single NG-RAN node may support multiple slices, and the NG-RAN 810 may also apply an appropriate RRM policy for the SLA in place to each supported slice. The NG-RAN 810 may also support QoS differentiation within a slice.

The NG-RAN 810 may also use the UE assistance information for the selection of an AMF 821 during an initial attach, if available. The NG-RAN 810 uses the assistance information for routing the initial NAS to an AMF 821. If the NG-RAN 810 is unable to select an AMF 821 using the assistance information, or the UE 801 does not provide any such information, the NG-RAN 810 sends the NAS signaling to a default AMF 821, which may be among a pool of AMFs 821. For subsequent accesses, the UE 801 provides a temp ID, which is assigned to the UE 801 by the 5GC 820, to enable the NG-RAN 810 to route the NAS message to the appropriate AMF 821 as long as the temp ID is valid. The NG-RAN 810 is aware of, and can reach, the AMF 821 that is associated with the temp ID. Otherwise, the method for initial attach applies.

The NG-RAN 810 supports resource isolation between slices. NG-RAN 810 resource isolation may be achieved by means of RRM policies and protection mechanisms that should avoid that shortage of shared resources if one slice breaks the service level agreement for another slice. In some implementations, it is possible to fully dedicate NG-RAN 810 resources to a certain slice. How NG-RAN 810 supports resource isolation is implementation dependent.

Some slices may be available only in part of the network. Awareness in the NG-RAN 810 of the slices supported in the cells of its neighbors may be beneficial for inter-frequency mobility in connected mode. The slice availability may not change within the UE's registration area. The NG-RAN 810 and the 5GC 820 are responsible to handle a service request for a slice that may or may not be available in a given area. Admission or rejection of access to a slice may depend on factors such as support for the slice, availability of resources, support of the requested service by NG-RAN 810.

The UE 801 may be associated with multiple network slices simultaneously. In case the UE 801 is associated with multiple slices simultaneously, only one signaling connection is maintained, and for intra-frequency cell reselection, the UE 801 tries to camp on the best cell. For inter-frequency cell reselection, dedicated priorities can be used to control the frequency on which the UE 801 camps. The 5GC 820 is to validate that the UE 801 has the rights to access a network slice. Prior to receiving an Initial Context Setup Request message, the NG-RAN 810 may be allowed to apply some provisional/local policies, based on awareness of a particular slice that the UE 801 is requesting to access. During the initial context setup, the NG-RAN 810 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
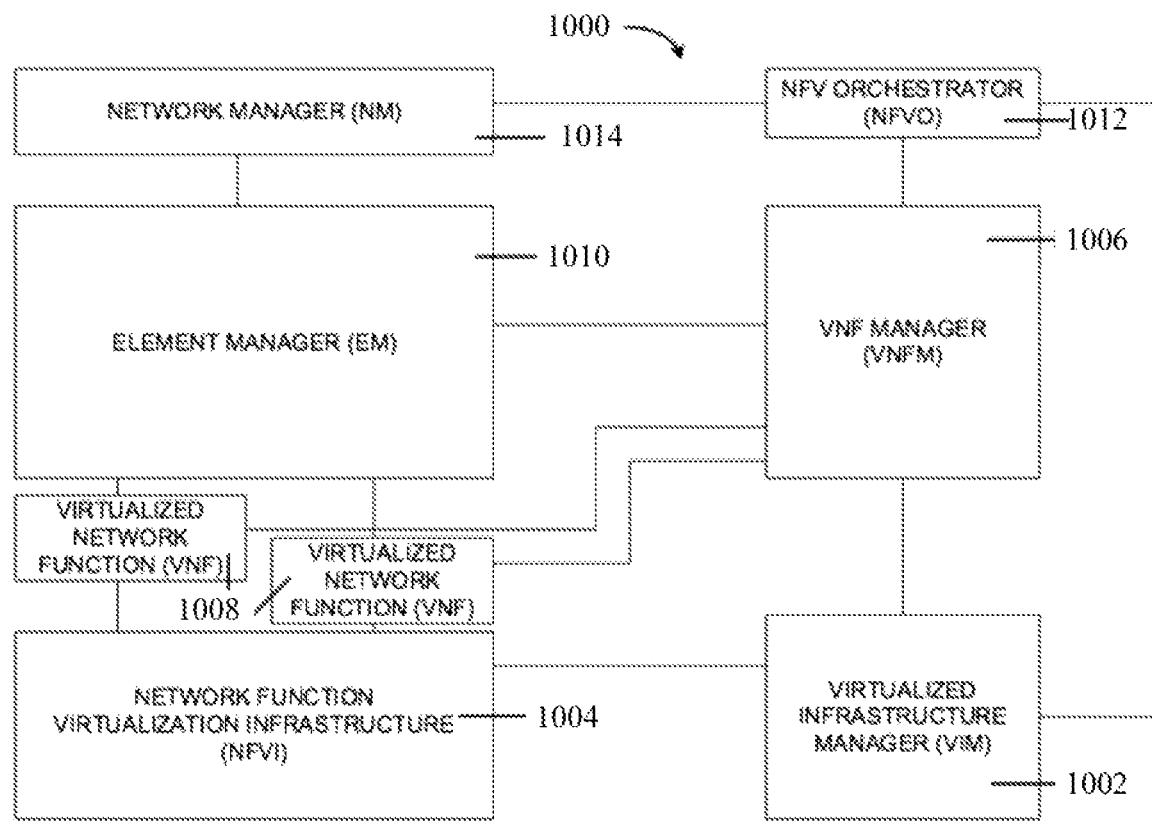
FIG. 10 is a block diagram illustrating components, according to some example embodiments, of a system to support NFV.

FIG. 10 is a block diagram illustrating components, according to some example embodiments, of a system 1000 to support NFV. The system 1000 is illustrated as including a VIM 1002, an NFVI 1004, an VNFM 1006, VNFs 1008, an EM 1010, an NFVO 1012, and a NM 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of VMs associated with one or more physical resources), track VM instances, track performance, fault and security of VM instances and associated physical resources and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, PM data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Devices/Components

Figure 2:
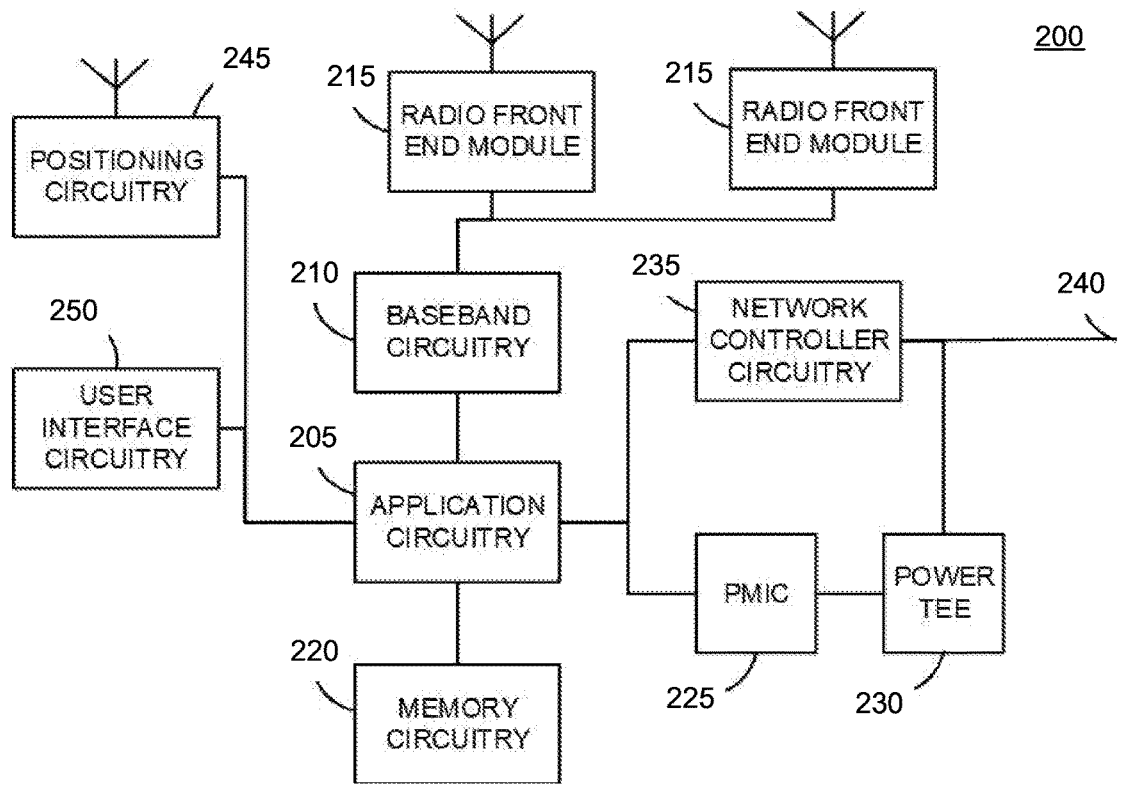
FIG. 2 illustrates an example of infrastructure equipment in accordance with various exemplary embodiments.

FIG. 2 illustrates an example of infrastructure equipment 200 in accordance with various exemplary embodiments. The infrastructure equipment 200 (or "system 200") may be implemented as a base station, radio head, RAN node such as the RAN nodes 111 and/or WLAN node 106 shown and described previously, application server(s) 130, and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and a user interface 250. In some embodiments, the device 200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 may comprise, or may be, a special-purpose processor/controller to operate according to the various embodiments herein. As examples, the processor(s) of application circuitry 205 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 200 may not utilize application circuitry 205, and instead may include a special-purpose processor/controller to process IP data received from an EPC or 5GC, for example.

In some implementations, the application circuitry 205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 205 may comprise logic blocks or logic fabric, and other interconnected resources that may be programmed to perform various functions, such as the procedures, methods, functions, etc. of the various embodiments discussed herein. In such embodiments, the circuitry of application circuitry 205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 210 are discussed further below with regard to FIG. 4.

User interface circuitry 250 may include one or more user interfaces designed to enable user interaction with the system 200 or peripheral component interfaces designed to enable peripheral component interaction with the system 200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 411 of FIG. 4), and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 220 may be implemented as one or more of solder down packaged integrated circuits, socketed memory modules and plug-in memory cards.

The PMIC 225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 230 may provide for electrical power drawn from a network cable to provide both power supply and data connectivity to the infrastructure equipment 200 using a single cable.

The network controller circuitry 235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 200 via network interface connector 240 using a physical connection, which may be electrical (commonly referred to as a "copper interconnect"), optical, or wireless. The network controller circuitry 235 may include one or more dedicated processors and/or FPGAs to communicate using one or more of the aforementioned protocols. In some implementations, the network controller circuitry 235 may include multiple controllers to provide connectivity to other networks using the same or different protocols.

The positioning circuitry 245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-Technology for Positioning, Navigation, and Timing (Micro-PNT) IC that uses a master timing clock to perform position tracking/estimation without GNSS assistance. The positioning circuitry 245 may also be part of, or interact with, the baseband circuitry 210 and/or RFEMs 215 to communicate with the nodes and components of the positioning network. The positioning circuitry 245 may also provide position data and/or time data to the application circuitry 205, which may use the data to synchronize operations with various infrastructure (e.g., RAN nodes 111, etc.), or the like.

The components shown by FIG. 2 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 3:
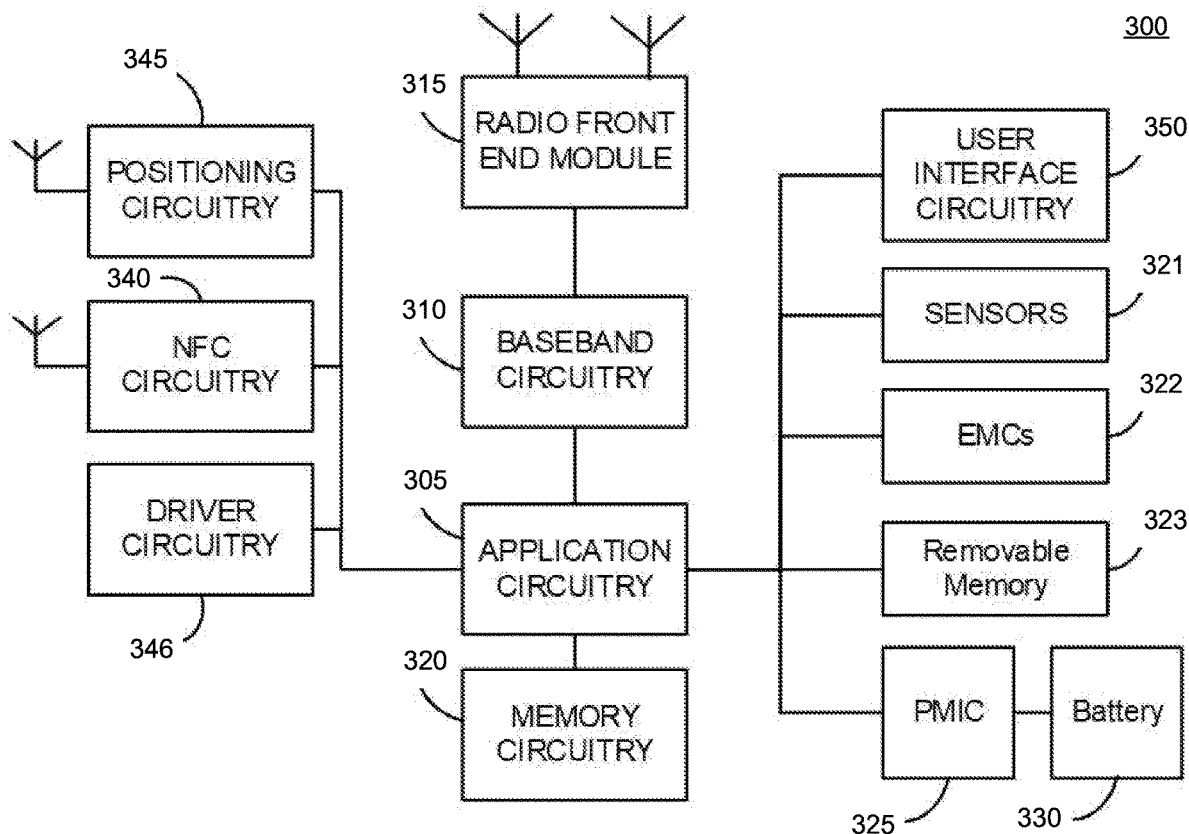
FIG. 3 illustrates an example of a platform (or "device") in accordance with various exemplary embodiments.

FIG. 3 illustrates an example of a platform 300 (or "device 300") in accordance with various exemplary embodiments. In embodiments, the computer platform 300 may be suitable for use as UEs 101, application servers 130, and/or any other element/device discussed herein. The platform 300 may include any combinations of the components shown in the example. The components of platform 300 may be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high level view of components of the computer platform 300. However, some of the components shown may be omitted, additional components may be present, and different arrangement of the components shown may occur in other implementations.

Application circuitry 305 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or nonvolatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 305 may comprise, or may be, a special-purpose processor/controller to operate according to the various embodiments herein.

As examples, the processor(s) of application circuitry 305 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 305 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 may be a part of a system on a chip (SoC) in which the application circuitry 305 and other components are formed into a single integrated circuit, or a single package, such as the Edison™ or Galileo™ SoC boards from Intel® Corporation.

Additionally or alternatively, application circuitry 305 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed infra with regard to FIG. 4.

The RFEMs 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 411 of FIG. 4), and the RFEM may be connected to multiple antennas. In alternative implementations, both mmWave and sub-mmWave radio functions may be implemented in the same physical RFEM 315, which incorporates both mmWave antennas and sub-mm-Wave.

The memory circuitry 320 may include any number and type of memory devices used to provide for a given amount of system memory. As examples, the memory circuitry 320 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 320 may be on-die memory or registers associated with the application circuitry 305. To provide for persistent storage of information such as data, applications, operating systems and so forth, memory circuitry 320 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 300 may incorporate the three-dimensional (3D) cross-point (XPOINT) memories from Intel® and Micron®.

Removable memory circuitry 323 may include devices, circuitry, enclosures/housings, ports or receptacles, etc. used to couple portable data storage devices with the platform 300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 300 may also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

The sensor circuitry 321 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 322 include devices, modules, or subsystems whose purpose is to enable platform 300 to change its state, position, and/or orientation, or move or control a mechanism or (sub)system. Additionally, EMCs 322 may be configured to generate and send messages/signaling to other components of the platform 300 to indicate a current state of the EMCs 322. Examples of the EMCs 322 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 300 is configured to operate one or more EMCs 322 based on one or more captured events and/or instructions or control signals received from a service provider and/or various clients.

In some implementations, the interface circuitry may connect the platform 300 with positioning circuitry 345. The positioning circuitry 345 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-PNT IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various infrastructure (e.g., radio base stations), for turn-by-turn navigation applications, or the like.

In some implementations, the interface circuitry may connect the platform 300 with Near-Field Communication (NFC) circuitry 340. NFC circuitry 340 is configured to provide contactless, short-range communications based on radio frequency identification (RFID) standards, wherein magnetic field induction is used to enable communication between NFC circuitry 340 and NFC-enabled devices external to the platform 300 (e.g., an "NFC touchpoint"). NFC circuitry 340 comprises an NFC controller coupled with an antenna element and a processor coupled with the NFC controller. The NFC controller may be a chip/IC providing NFC functionalities to the NFC circuitry 340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 340, or initiate data transfer between the NFC circuitry 340 and another active NFC device (e.g., a smartphone or an NFC-enabled POS terminal) that is proximate to the platform 300.

The driver circuitry 346 may include software and hardware elements that operate to control particular devices that are embedded in the platform 300, attached to the platform 300, or otherwise communicatively coupled with the platform 300. The driver circuitry 346 may include individual drivers allowing other components of the platform 300 to interact with or control various input/output (I/O) devices that may be present within, or connected to, the platform 300. For example, driver circuitry 346 may include a display driver to control and allow access to a display device, a touchscreen driver to control and allow access to a touchscreen interface of the platform 300, sensor drivers to obtain sensor readings of sensor circuitry 321 and control and allow access to sensor circuitry 321, EMC drivers to obtain actuator positions of the EMCs 322 and/or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 300. In particular, with respect to the baseband circuitry 310, the PMIC 325 may control power-source selection, voltage scaling, battery charging, or DC-to-DC conversion. The PMIC 325 may often be included when the platform 300 is capable of being powered by a battery 330, for example, when the device is included in a UE 101, 701 or 801.

In some embodiments, the PMIC 325 may control, or otherwise be part of, various power saving mechanisms of the platform 300. For example, if the platform 300 is in an RRC_Connected state, where it is still connected to the RAN node as it expects to receive traffic shortly, then it may enter a state known as Discontinuous Reception Mode (DRX) after a period of inactivity. During this state, the platform 300 may power down for brief intervals of time and thus save power. If there is no data traffic activity for an extended period of time, then the platform 300 may transition off to an RRC_Idle state, where it disconnects from the network and does not perform operations such as channel quality feedback, handover, etc. The platform 300 goes into a very low power state and it performs paging where again it periodically wakes up to listen to the network and then powers down again. The platform 300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 330 may power the platform 300, although in some examples the platform 300 may be mounted deployed in a fixed location and may have a power supply coupled to an electrical grid. The battery 330 may be a lithium ion battery, a metal-air battery, such as a zinc-air battery, an aluminum-air battery, a lithium-air battery, and the like. In some implementations, such as in V2X applications, the battery 330 may be a typical lead-acid automotive battery.

In some implementations, the battery 330 may be a "smart battery," which includes or is coupled with a Battery Management System (BMS) or battery monitoring integrated circuitry. The BMS may be included in the platform 300 to track the state of charge (SoCh) of the battery 330. The BMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 300. The BMS may also include an analog-to-digital (ADC) convertor that allows the application circuitry 305 to directly monitor the voltage of the battery 330 or the current flow from the battery 330. The battery parameters may be used to determine actions that the platform 300 may perform, such as transmission frequency, network operation, sensing frequency, and the like.

A power block, or other power supply coupled to an electrical grid may be coupled with the BMS to charge the battery 330. In some examples, the power block may be replaced with a wireless power receiver to obtain the power wirelessly, for example, through a loop antenna in the computer platform 300. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 350 includes various input/output (I/O) devices present within, or connected to, the platform 300, and includes one or more user interfaces designed to enable user interaction with the platform 300 and/or peripheral component interfaces designed to enable peripheral component interaction with the platform 300. The user interface circuitry 350 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 300. The output device circuitry may also include speakers or other audio emitting devices, printer(s), and/or the like. In some embodiments, the sensor circuitry 321 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 300 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 4:
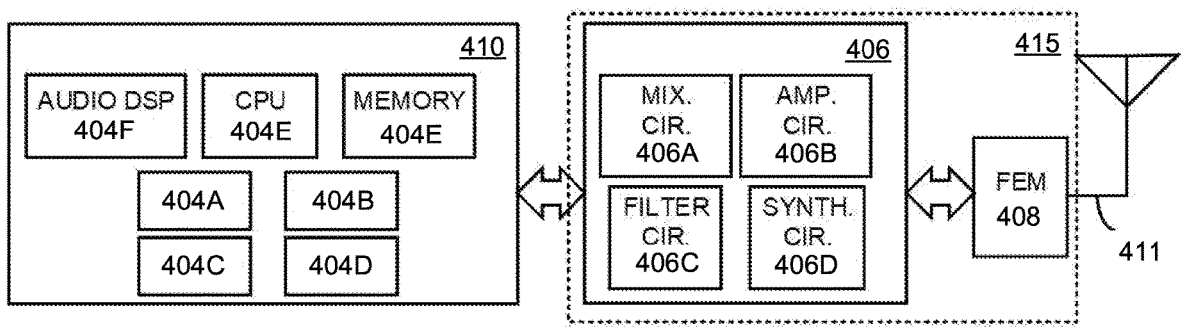
FIG. 4 illustrates example components of baseband circuitry and radio front end modules (RFEM) in accordance with various exemplary embodiments.

FIG. 4 illustrates example components of baseband circuitry 410 and radio front end modules (RFEM) 415 in accordance with various exemplary embodiments. The baseband circuitry 410 corresponds to the baseband circuitry 210 and 310 of FIGS. 2 and 3, respectively. The RFEM 415 corresponds to the RFEM 215 and 315 of FIGS. 2 and 3, respectively. As shown, the RFEMs 415 may include Radio Frequency (RF) circuitry 406, front-end module (FEM) circuitry 408, antenna array 411 coupled together at least as shown.

The baseband circuitry 410 includes circuitry and/or control logic configured to carry out various radio/network protocol and radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 410 may include Fast-Fourier Transform (FFT), preceding, or constellation mapping/demapping functionality. In some embodiments, encoding/decoding circuitry of the baseband circuitry 410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 410 is configured to process baseband signals received from a receive signal path of the RF circuitry 406 and to generate baseband signals for a transmit signal path of the RF circuitry 406. The baseband circuitry 410 is configured to interface with application circuitry 205/305 (see FIGS. 2 and 3) for generation and processing of the baseband signals and for controlling operations of the RF circuitry 406. The baseband circuitry 410 may handle various radio control functions.

The aforementioned circuitry and/or control logic of the baseband circuitry 410 may include one or more single or multi-core processors. For example, the one or more processors may include a 3G baseband processor 404A, a 4G/LTE baseband processor 404B, a 5G/NR baseband processor 404C, or some other baseband processor(s) 404D for other existing generations, generations in development or to be developed in the future (e.g., sixth generation (6G), etc.). In other embodiments, some or all of the functionality of baseband processors 404A-D may be included in modules stored in the memory 404G and executed via a Central Processing Unit (CPU) 404E. In other embodiments, some or all of the functionality of baseband processors 404A-D may be provided as hardware accelerators (e.g., FPGAs, ASICs, etc.) loaded with the appropriate bit streams or logic blocks stored in respective memory cells. In various embodiments, the memory 404G may store program code of a real-time OS (RTOS), which when executed by the CPU 404E (or other baseband processor), is to cause the CPU 404E (or other baseband processor) to manage resources of the baseband circuitry 410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 410 includes one or more audio digital signal processor(s) (DSP) 404F. The audio DSP(s) 404F include elements for compression/decompression and echo cancellation and may include other suitable processing elements in other embodiments.

In some embodiments, each of the processors 404A-404E include respective memory interfaces to send/receive data to/from the memory 404G. The baseband circuitry 410 may further include one or more interfaces to communicatively couple to other circuitries/devices, such as an interface to send/receive data to/from memory external to the baseband circuitry 410; an application circuitry interface to send/receive data to/from the application circuitry 205/305 of FIGS. 2-3); an RF circuitry interface to send/receive data to/from RF circuitry 406 of FIG. 4; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 325.

In alternate embodiments (which may be combined with the above described embodiments), baseband circuitry 410 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (e.g., the radio front end modules 415).

Although not shown by FIG. 4, in some embodiments, the baseband circuitry 410 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 410 and/or RF circuitry 406 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 410 and/or RF circuitry 406 are part of a Wi-Fi communication system. In the second example, the protocol processing circuitry would operate Wi-Fi MAC and logical link control (LLC) functions. The protocol processing circuitry may include one or more memory structures (e.g., 404G) to store program code and data for operating the protocol functions, as well as one or more processing cores to execute the program code and perform various operations using the data. The baseband circuitry 410 may also support radio communications for more than one wireless protocol.

The various hardware elements of the baseband circuitry 410 discussed herein may be implemented, for example, as a solder-down substrate including one or more integrated circuits (ICs), a single packaged IC soldered to a main circuit board or a multi-chip module containing two or more ICs. In one example, the components of the baseband circuitry 410 may be suitably combined in a single chip or chipset or disposed on a same circuit board. In another example, some or all of the constituent components of the baseband circuitry 410 and RF circuitry 406 may be implemented together such as, for example, a system on a chip (SoC) or System-in-Package (SiP). In another example, some or all of the constituent components of the baseband circuitry 410 may be implemented as a separate SoC that is communicatively coupled with and RF circuitry 406 (or multiple instances of RF circuitry 406). In yet another example, some or all of the constituent components of the baseband circuitry 410 and the application circuitry 205/305 may be implemented together as individual SoCs mounted to a same circuit board (e.g., a "multi-chip package").

In some embodiments, the baseband circuitry 410 may provide for communication compatible with one or more radio technologies. For example, in some embodiments, the baseband circuitry 410 may support communication with an E-UTRAN or other WMAN, a WLAN, a WPAN. Embodiments in which the baseband circuitry 410 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path, which may include circuitry to down-convert RF signals received from the FEM circuitry 408 and provide baseband signals to the baseband circuitry 410. RF circuitry 406 may also include a transmit signal path, which may include circuitry to up-convert baseband signals provided by the baseband circuitry 410 and provide RF output signals to the FEM circuitry 408 for transmission.

In some embodiments, the receive signal path of the RF circuitry 406 may include mixer circuitry 406*a*, amplifier circuitry 406*b* and filter circuitry 406*c*. In some embodiments, the transmit signal path of the RF circuitry 406 may include filter circuitry 406*c* and mixer circuitry 406*a*. RF circuitry 406 may also include synthesizer circuitry 406*d* for synthesizing a frequency for use by the mixer circuitry 406*a* of the receive signal path and the transmit signal path. In some embodiments, the mixer circuitry 406*a* of the receive signal path may be configured to down-convert RF signals received from the FEM circuitry 408 based on the synthesized frequency provided by synthesizer circuitry 406*d*. The amplifier circuitry 406*b* may be configured to amplify the down-converted signals and the filter circuitry 406*c* may be a low-pass filter (LPF) or band-pass filter (BPF) configured to remove unwanted signals from the down-converted signals to generate output baseband signals. Output baseband signals may be provided to the baseband circuitry 410 for further processing. In some embodiments, the output baseband signals may be zero-frequency baseband signals, although this is not a requirement. In some embodiments, mixer circuitry 406*a* of the receive signal path may comprise passive mixers, although the scope of the embodiments is not limited in this respect.

In some embodiments, the mixer circuitry 406*a* of the transmit signal path may be configured to up-convert input baseband signals based on the synthesized frequency provided by the synthesizer circuitry 406*d* to generate RF output signals for the FEM circuitry 408. The baseband signals may be provided by the baseband circuitry 410 and may be filtered by filter circuitry 406*c*.

In some embodiments, the mixer circuitry 406*a* of the receive signal path and the mixer circuitry 406*a* of the transmit signal path may include two or more mixers and may be arranged for quadrature downconversion and upconversion, respectively. In some embodiments, the mixer circuitry 406*a* of the receive signal path and the mixer circuitry 406*a* of the transmit signal path may include two or more mixers and may be arranged for image rejection (e.g., Hartley image rejection). In some embodiments, the mixer circuitry 406*a* of the receive signal path and the mixer circuitry 406*a* of the transmit signal path may be arranged for direct downconversion and direct upconversion, respectively. In some embodiments, the mixer circuitry 406*a* of the receive signal path and the mixer circuitry 406*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 410 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406*d* may be a fractional-N synthesizer or a fractional N/N+1 synthesizer, although the scope of the embodiments is not limited in this respect as other types of frequency synthesizers may be suitable. For example, synthesizer circuitry 406*d* may be a delta-sigma synthesizer, a frequency multiplier, or a synthesizer comprising a phase-locked loop with a frequency divider.

The synthesizer circuitry 406*d* may be configured to synthesize an output frequency for use by the mixer circuitry 406*a* of the RF circuitry 406 based on a frequency input and a divider control input. In some embodiments, the synthesizer circuitry 406*d* may be a fractional N/N+1 synthesizer.

In some embodiments, frequency input may be provided by a voltage controlled oscillator (VCO), although that is not a requirement. Divider control input may be provided by either the baseband circuitry 410 or the application circuitry 205/305 depending on the desired output frequency. In some embodiments, a divider control input (e.g., N) may be determined from a look-up table based on a channel indicated by the application circuitry 205/305.

Synthesizer circuitry 406*d* of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path, which may include circuitry configured to operate on RF signals received from antenna array 411, amplify the received signals and provide the amplified versions of the received signals to the RF circuitry 406 for further processing. FEM circuitry 408 may also include a transmit signal path, which may include circuitry configured to amplify signals for transmission provided by the RF circuitry 406 for transmission by one or more of antenna elements of antenna array 411. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission by one or more antenna elements of the antenna array 411.

The antenna array 411 comprises one or more antenna elements, each of which is configured convert electrical signals into radio waves to travel through the air and to convert received radio waves into electrical signals. For example, digital baseband signals provided by the baseband circuitry 410 is converted into analog RF signals (e.g., modulated waveform) that will be amplified and transmitted via the antenna elements of the antenna array 411 including one or more antenna elements (not shown). The antenna elements may be omnidirectional, direction, or a combination thereof. The antenna elements may be formed in a multitude of arranges as are known and/or discussed herein. The antenna array 411 may comprise microstrip antennas or printed antennas that are fabricated on the surface of one or more printed circuit boards. The antenna array 411 may be formed in as a patch of metal foil (e.g., a patch antenna) in a variety of shapes, and may be coupled with the RF circuitry 406 and/or FEM circuitry 408 using metal transmission lines or the like.

Processors of the application circuitry 205/305 and processors of the baseband circuitry 410 may be used to execute elements of one or more instances of a protocol stack. For example, processors of the baseband circuitry 410, alone or in combination, may be used execute Layer 3, Layer 2, or Layer 1 functionality, while processors of the application circuitry 205/305 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 5:
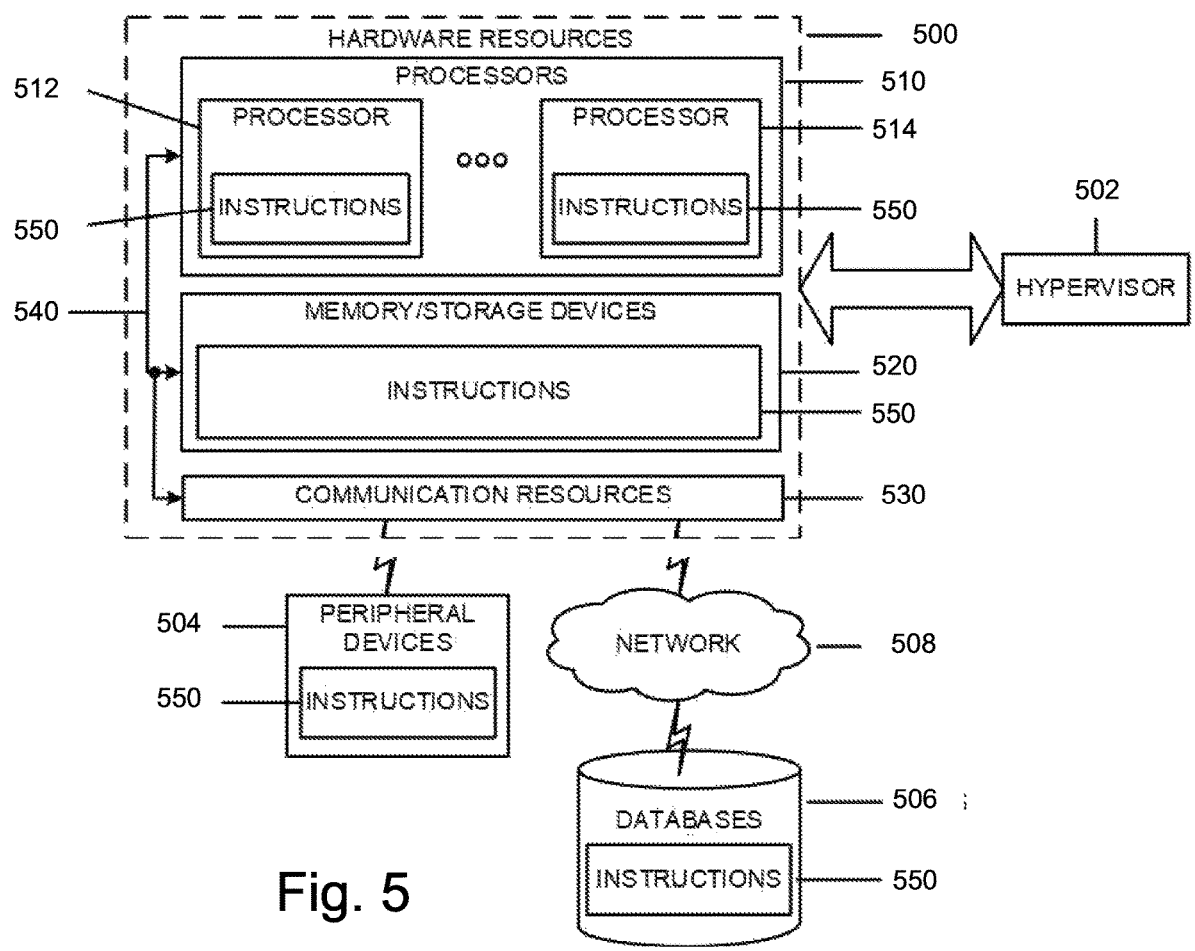
FIG. 5 is a block diagram illustrating components, according to some example embodiments, able to read instructions from a machine-readable or computer-readable medium (e.g., a non-transitory machine-readable storage medium) and perform any one or more of the methodologies discussed herein.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processor(s) 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via USB), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Protocol Layers

Figure 6:
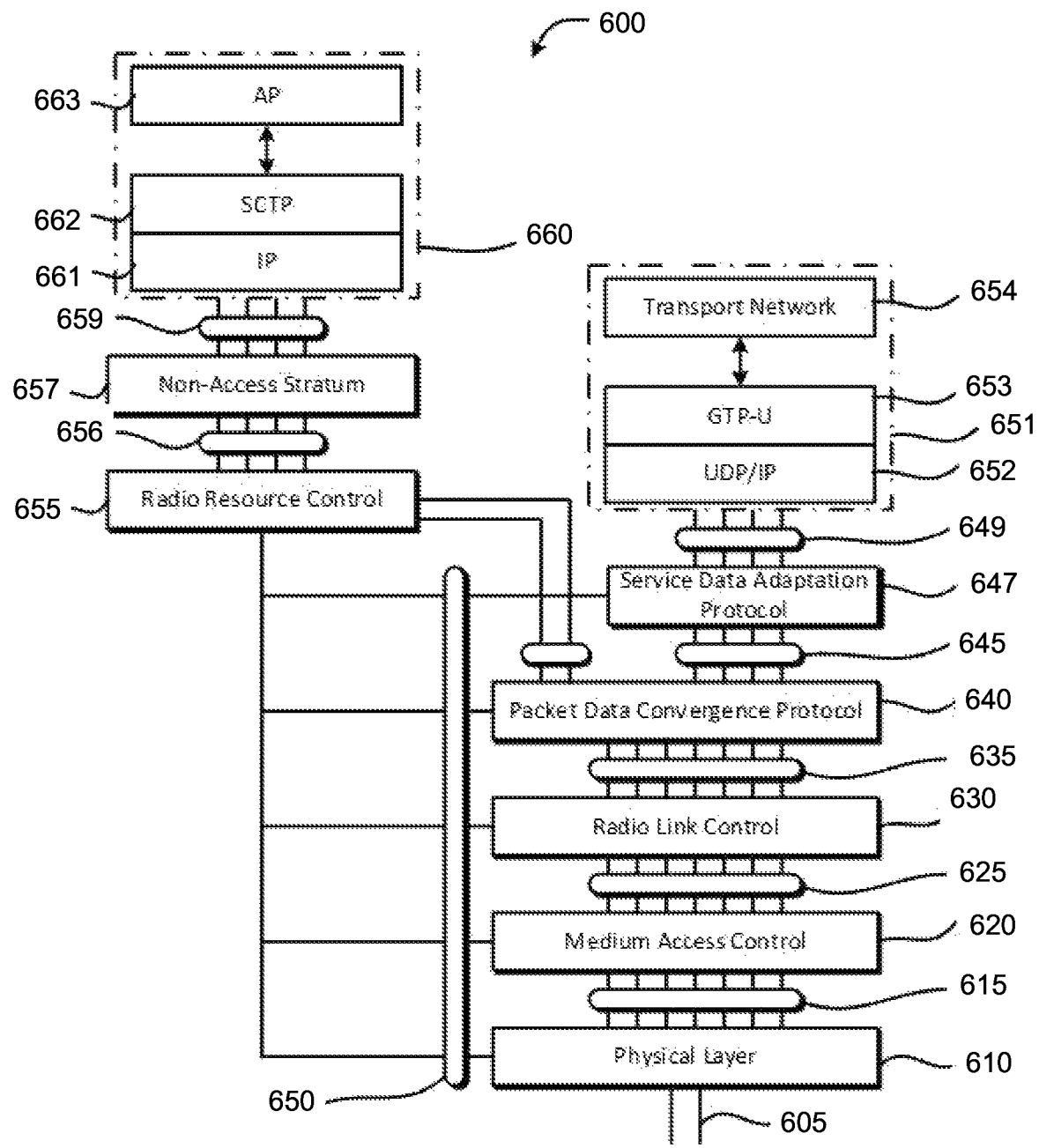
FIG. 6 illustrates various protocol functions that may be implemented in a wireless communication device according to various exemplary embodiments.

FIG. 6 illustrates various protocol functions that may be implemented in a wireless communication device according to various exemplary embodiments. In particular, FIG. 6 includes an arrangement 600 showing interconnections between various protocol layers/entities. The following description of FIG. 6 is provided for various protocol layers/entities that operate in conjunction with the 5G/NR system standards and LTE system standards, but some or all of the aspects of FIG. 6 may be applicable to other wireless communication network systems as well.

The protocol layers of arrangement 600 may include one or more of PHY 610, MAC 620, RLC 630, PDCP 640, SDAP 647, RRC 655, and NAS layer 657, in addition to other higher layer functions not illustrated. The protocol layers may include one or more service access points (SAPs) (e.g., items 659, 656, 650, 649, 645, 635, 625, and 615 in FIG. 6) that may provide communication between two or more protocol layers.

The PHY 610 may transmit and receive physical layer signals 605 that may be received from or transmitted to one or more other communication devices. The physical layer signals 605 may comprise one or more physical channels, such as those discussed herein. The PHY 610 may further perform link adaptation or adaptive modulation and coding (AMC), power control, cell search (e.g., for initial synchronization and handover purposes), and other measurements used by higher layers, such as the RRC 655. The PHY 610 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 610 may process requests from and provide indications to an instance of MAC 620 via one or more PHY-SAP 615. According to some embodiments, requests and indications communicated via PHY-SAP 615 may comprise one or more transport channels.

Instance(s) of MAC 620 may process requests from, and provide indications to, an instance of RLC 630 via one or more MAC-SAPs 625. These requests and indications communicated via the MAC-SAP 625 may comprise one or more logical channels. The MAC 620 may perform mapping between the logical channels and transport channels, multiplexing of MAC SDUs from one or more logical channels onto TBs to be delivered to PHY 610 via the transport channels, de-multiplexing MAC SDUs to one or more logical channels from TBs delivered from the PHY 610 via transport channels, multiplexing MAC SDUs onto TBs, scheduling information reporting, error correction through HARQ, and logical channel prioritization.

Instance(s) of RLC 630 may process requests from and provide indications to an instance of PDCP 640 via one or more radio link control service access points (RLC-SAP) 635. These requests and indications communicated via RLC-SAP 635 may comprise one or more RLC channels. The RLC 630 may operate in a plurality of modes of operation, including: Transparent Mode™, Unacknowledged Mode (UM), and Acknowledged Mode (AM). The RLC 630 may execute transfer of upper layer protocol data units (PDUs), error correction through automatic repeat request (ARQ) for AM data transfers, and concatenation, segmentation and reassembly of RLC SDUs for UM and AM data transfers. The RLC 630 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 640 may process requests from and provide indications to instance(s) of RRC 655 and/or instance(s) of SDAP 647 via one or more packet data convergence protocol service access points (PDCP-SAP) 645. These requests and indications communicated via PDCP-SAP 645 may comprise one or more radio bearers. The PDCP 640 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 647 may process requests from and provide indications to one or more higher layer protocol entities via one or more SDAP-SAP 649. These requests and indications communicated via SDAP-SAP 649 may comprise one or more QoS flows. The SDAP 647 may map QoS flows to DRBs, and vice versa, and may also mark QFIs in DL and UL packets. A single SDAP entity 647 may be configured for an individual PDU session. In the UL direction, the 5G NR-RAN 110 may control the mapping of QoS Flows to DRB(s) in two different ways, reflective mapping or explicit mapping. For reflective mapping, the SDAP 647 of a UE 101 may monitor the QFIs of the DL packets for each DRB and may apply the same mapping for packets flowing in the UL direction. For a DRB, the SDAP 647 of the UE 101 may map the UL packets belonging to the QoS flows(s) corresponding to the QoS flow ID(s) and PDU session observed in the DL packets for that DRB. To enable reflective mapping, the 5G NR-RAN 110 may mark DL packets over the Uu interface with a QoS flow ID. The explicit mapping may involve the RRC 655 configuring the SDAP 647 with an explicit QoS flow to DRB mapping rule, which may be stored and followed by the SDAP 647. In embodiments, the SDAP 647 may only be used in NR implementations and may not be used in LTE implementations.

The RRC 655 may configure, via one or more management service access points (M-SAP), aspects of one or more protocol layers, which may include one or more instances of PHY 610, MAC 620, RLC 630, PDCP 640 and SDAP 647. In embodiments, an instance of RRC 655 may process requests from and provide indications to one or more NAS entities 657 via one or more RRC-SAPs 656. The main services and functions of the RRC 655 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 657 may form the highest stratum of the control plane between the UE 101 and the AMF 821. The NAS 657 may support the mobility of the UEs 101 and the session management procedures to establish and maintain IP connectivity between the UE 101 and a P-GW in LTE systems.

According to various embodiments, one or more protocol entities of arrangement 600 may be implemented in UEs 101, RAN nodes 111, the AMF in NR implementations or the MME in LTE implementations, UPFs in NR implementations or S-GWs and P-GWs in LTE implementations, or the like to be used for control plane or user plane communications protocol stack between the aforementioned devices. In such embodiments, one or more protocol entities that may be implemented in one or more of UE 101, gNB 111, the AMF, etc. may communicate with a respective peer protocol entity that may be implemented in or on another device using the services of respective lower layer protocol entities to perform such communication. In some embodiments, a gNB-CU of the gNB 111 may host the RRC 655, SDAP 647, and PDCP 640 of the gNB that controls the operation of one or more gNB-DUs, and the gNB-DUs of the gNB 111 may each host the RLC 630, MAC 620, and PHY 510 of the gNB 111.

In a first example, a control plane protocol stack may comprise, in order from highest layer to lowest layer, NAS 557, RRC 555, PDCP 640, RLC 630, MAC 520, and PHY 510. In this example, upper layers 660 may be built on top of the NAS 557, which includes an IP layer 661, an SCTP 662, and an application layer signaling protocol (AP) 663.

In NR implementations, the AP 663 may be a 5G NR application protocol layer (5G NR AP or NR-AP) 663 for the 5G NR interface 113 defined between the 5G NR-RAN node 111 and the AMF, or the AP 663 may be an Xn application protocol layer (XnAP or Xn-AP) 663 for the Xn interface 112 that is defined between two or more RAN nodes 111.

The 5G NR-AP 663 may support the functions of the 5G NR interface 113 and may comprise Elementary Procedures (EPs). A 5G NR-AP EP may be a unit of interaction between the 5G NR-RAN node 111 and the AMF. The 5G NR-AP 663 services may comprise two groups: UE-associated services (e.g., services related to a UE 101) and non-UE-associated services (e.g., services related to the whole 5G NR interface instance between the 5G NR-RAN node 111 and the AMF). These services may include functions including, but not limited to: a paging function for the sending of paging requests to 5G NR-RAN nodes 111 involved in a particular paging area; a UE context management function for allowing the AMF to establish, modify, and/or release a UE context in the AMF and the 5G NR-RAN node 111; a mobility function for UEs 101 in ECM-CONNECTED mode for intra-system HOs to support mobility within 5G NR-RAN and inter-system HOs to support mobility from/to EPS systems; a NAS Signaling Transport function for transporting or rerouting NAS messages between UE 101 and AMF; a NAS node selection function for determining an association between the AMF and the UE 101; 5G NR interface management function(s) for setting up the 5G NR interface and monitoring for errors over the 5G NR interface; a warning message transmission function for providing means to transfer warning messages via 5G NR interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 663 may support the functions of the Xn interface 112 and may comprise XnAP basic mobility procedures and XnAP global procedures. The XnAP basic mobility procedures may comprise procedures used to handle UE mobility within the 5G NR RAN 111 (or E-UTRAN 111), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, 5G NR-RAN update procedures, cell activation procedures, and the like.

In LTE implementations, the AP 663 may be an S1 Application Protocol layer (S1-AP) 663 for the S1 interface 113 defined between an E-UTRAN node 111 and an MME, or the AP 663 may be an X2 application protocol layer (X2AP or X2-AP) 663 for the X2 interface 112 that is defined between two or more E-UTRAN nodes 111.

The S1 Application Protocol layer (S1-AP) 663 may support the functions of the S1 interface, and similar to the 5G NR-AP discussed previously, the S1-AP may comprise S1-AP EPs. An S1-AP EP may be a unit of interaction between the E-UTRAN node 111 and an MME within an LTE CN 120. The S1-AP 663 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 663 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 662 may provide guaranteed delivery of application layer messages (e.g., 5G NRAP or XnAP messages in NR implementations, or S1-AP or X2AP messages in LTE implementations). The SCTP 662 may ensure reliable delivery of signaling messages between the RAN node 111 and the AMF/MME based, in part, on the IP protocol, supported by the IP 661. The Internet Protocol layer (IP) 661 may be used to perform packet addressing and routing functionality. In some implementations the IP layer 661 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 647, PDCP 640, RLC 630, MAC 520, and PHY 510. The user plane protocol stack may be used for communication between the UE 101, the RAN node 111, and UPF in NR implementations or an S-GW and P-GW in LTE implementations. In this example, upper layers 651 may be built on top of the SDAP 647 and may include a user datagram protocol (UDP) and IP security layer (UDP/IP) 652, a General Packet Radio Service (GPRS) Tunneling Protocol for the user plane layer (GTP-U) 653, and a User Plane PDU layer (UP PDU) 663.

The transport network layer 654 (also referred to as a "transport layer") may be built on IP transport, and the GTP-U 653 may be used on top of the UDP/IP layer 652 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 653 may be used for carrying user data within the GPRS core network and between the radio access network and the core network. The user data transported can be packets in any of IPv4, IPv6, or PPP formats, for example. The UDP/IP 652 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer (e.g., PHY 610), an L2 layer (e.g., MAC 620, RLC 630, PDCP 640, and/or SDAP 647), the UDP/IP layer 652, and the GTP-U 653. The S-GW and the P-GW may utilize an S5/S8a interface to exchange user plane data via a protocol stack comprising an L1 layer, an L2 layer, the UDP/IP layer 652, and the GTP-U 653. As discussed previously, NAS protocols may support the mobility of the UE 101 and the session management procedures to establish and maintain IP connectivity between the UE 101 and the P-GW.

Moreover, although not shown by FIG. 6, an application layer may be present above the AP 663 and/or the transport network layer 654. The application layer may be a layer in which a user of the UE 101, RAN node 111, or other network element interacts with software applications being executed, for example, by application circuitry 205 or application circuitry 305, respectively. The application layer may also provide one or more interfaces for software applications to interact with communications systems of the UE 101 or RAN node 111, such as the baseband circuitry 410. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Beamforming Overview

Figure 11A:
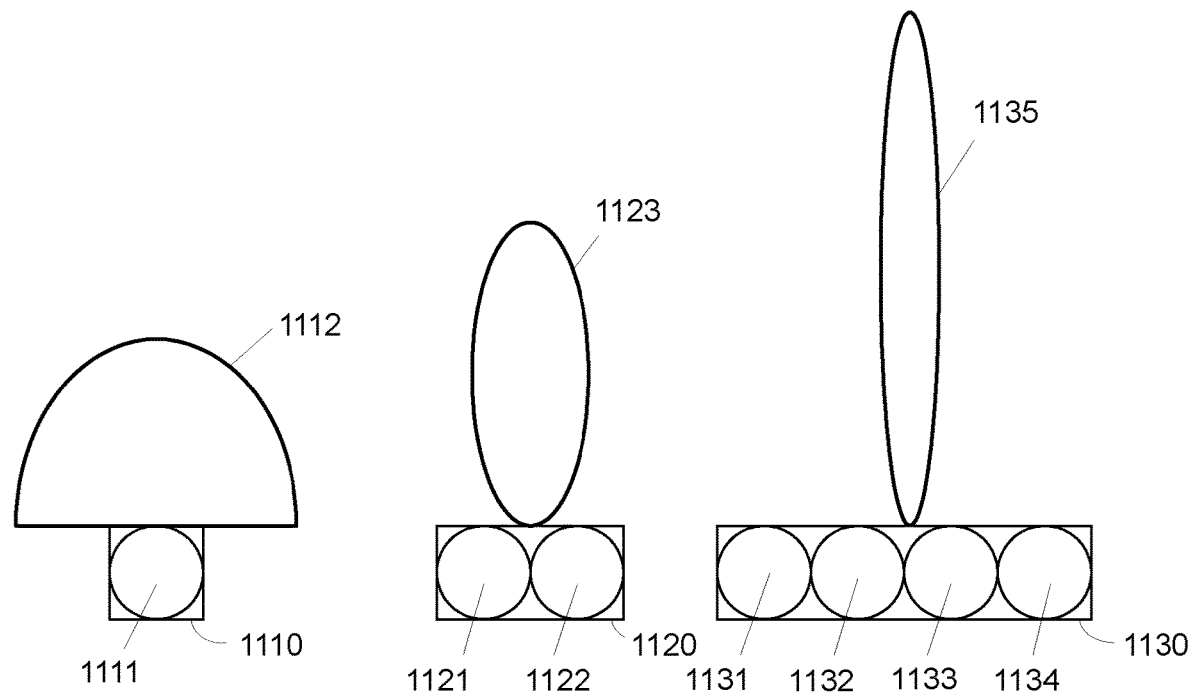
FIG. 11a shows an example of three antenna modules and their corresponding radiation patterns.

To generate a beam, a plurality of antenna elements may be configured to radiate the same signal. Increasing the number of antenna elements radiating the signal decreases the width of the radiation pattern and increases the gain. FIG. 11a shows an example of three antenna modules 1110, 1120, 1130 and their corresponding radiation patterns 1112, 1123, 1135. Antenna module 1110 includes a single antenna element 1111 and generates the radiation pattern 1112. Antenna module 1120 includes two antenna elements 1121, 1122 and generates the radiation pattern 1123. Antenna module 30 includes four antenna elements 1141-1144 and generates the radiation pattern 1135. A comparison of the radiation patterns 1112, 1123, 1135 illustrates the effects the number of antenna elements has on the geometry of the radiation pattern. For instance, in this example, the radiation pattern 1112 is the widest radiation pattern because the antenna module 1110 has the fewest number of antenna elements (e.g., one). The antenna module 1120 has two antenna elements 1121, 1122. The additional antenna element allows antenna module 1120 to generate a radiation pattern 1123 that is narrower than the radiation pattern 1112. The antenna module 1130 has four antenna elements 1141-1144. Thus, compared to antenna modules 1110, 1120, antenna module 1130 has the most antenna elements. As a result, the antenna module 1130 is able to generate a radiation pattern 1135 that is narrower than the radiation patterns 1112, 1123 and provides the most gain.

To establish and/or maintain a communication link with the base station, the UE may transmit a beam in any of a plurality of different directions. The direction in which a beam is propagated may be based on the phase and/or magnitude of the signal provided to each antenna element of the antenna module. Thus, the antenna module may be able to cover a spatial area with a plurality of beams each propagated in a different direction by appropriately weighting the phase and/or magnitude of the signal provided to each antenna element for each beam.

Figure 11B:
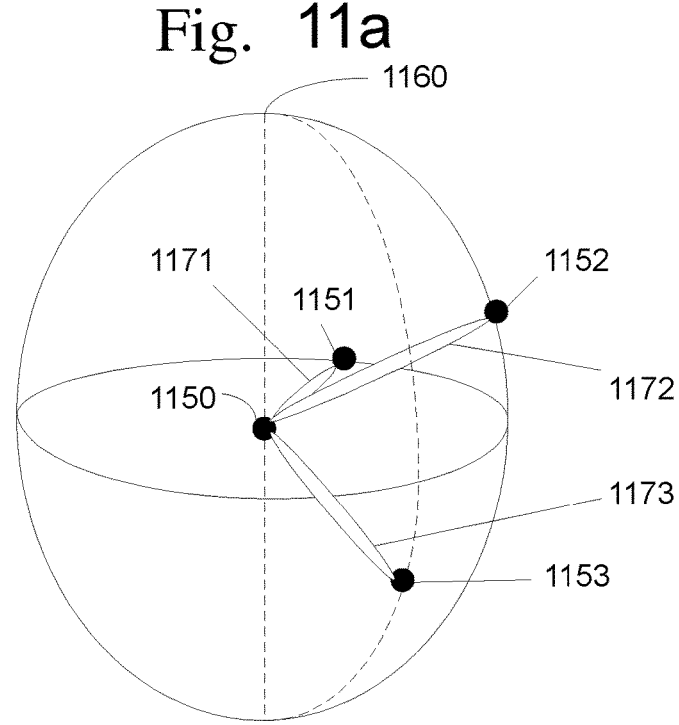
FIG. 11b shows an example of the directions in which an antenna module may propagate a beam.

FIG. 11b shows an example of the directions in which an antenna module 1150 may propagate a beam. The antenna module 1150 is located at the center of the spherical coordinate system 1160 and represents a transmission point. Points 1151, 1152, 1153 on the spherical coordinate system 1160 each represent a different reception point. At a first time, the antenna elements of the antenna module 1150 are provided with a first input signal to propagate a beam 1171 in the direction of reception point 1151. The direction of the beam 1171 is generated based on the phase and/or magnitude of the signal provided to each antenna element of the antenna module 1150. At a second time, the antenna elements of the antenna module 1150 are provided with a second input signal to propagate the beam 1172 in the direction of the reception point 1152. Similarly, the direction of the beam 1172 is generated based on the phase and/or magnitude of the signal provided to each antenna element of the antenna module 1150. At a third time, the antenna elements of the antenna module 1150 are provided with a third input signal to propagate the beam 1173 in the direction of the reception point 1153. Again, the direction of the beam 1173 is generated based on the phase and/or magnitude of the signal provided to each antenna element of the antenna module 1150. Thus, the antenna module 1150 may deliver the beams 1171, 1172, 1173 to receptions points 1151, 1152, 1153 from the same transmission point despite the reception points 1151, 1152, 1153 each being located in different horizontal and vertical directions relative to the antenna element 1150. The above example is merely provided for illustrative purposes. The exemplary embodiments may propagate a beam in any direction and control the direction of the beam in any appropriate manner.

Establishing and/or maintaining a communication link over the mmWave spectrum may include a process referred to as beam management. The term beam management may encompass various mechanisms and operations that may be performed on both the UE side and the network side. Beam management mechanisms may be utilized in various types of scenarios, including but not limited to, establishing a beam pair, a handover from a first base station to a second base station, transitioning between operating states (e.g., idle to connected mode), exiting a sleep mode utilized in accordance with a connected discontinuous reception (C-DRX) cycle, adjusting a receiver beam relative to a transmitter beam based on measurement data, etc. However, any reference to a transmitter beam, a receiver beam, or beam management is for illustrative purposes. Different networks and/or entities may refer to similar concepts by different names.

The polarization of an antenna refers to the orientation of the electric field (E-plane) of the radio wave relative to a coordinate system. For example, if a direction of oscillation for an electric field V is aligned with, i.e. propagated in a direction orthogonal to, the vertical direction of a coordinate system, the V wave may be considered to be vertically polarized. Similarly, if a direction of oscillation for an electric field is in a direction orthogonal to the horizontal direction of a coordinate system, the H wave may be considered to be horizontally polarized. In dual-polarization beamforming, specifically linear polarization, two data streams may be transmitted with polarizations in phase with and orthogonal to, i.e. having a polarization of 90 deg relative to, one another so that the sum of the streams is a linear vector. Other types of polarization include circular polarization, where the phase difference between H and V is 90 deg, and elliptic polarization, where the phase difference between H and V is some value between 0 deg and 90 deg.

Interference Mitigation During Simultaneous UE Tx/Rx

Figure 12A:
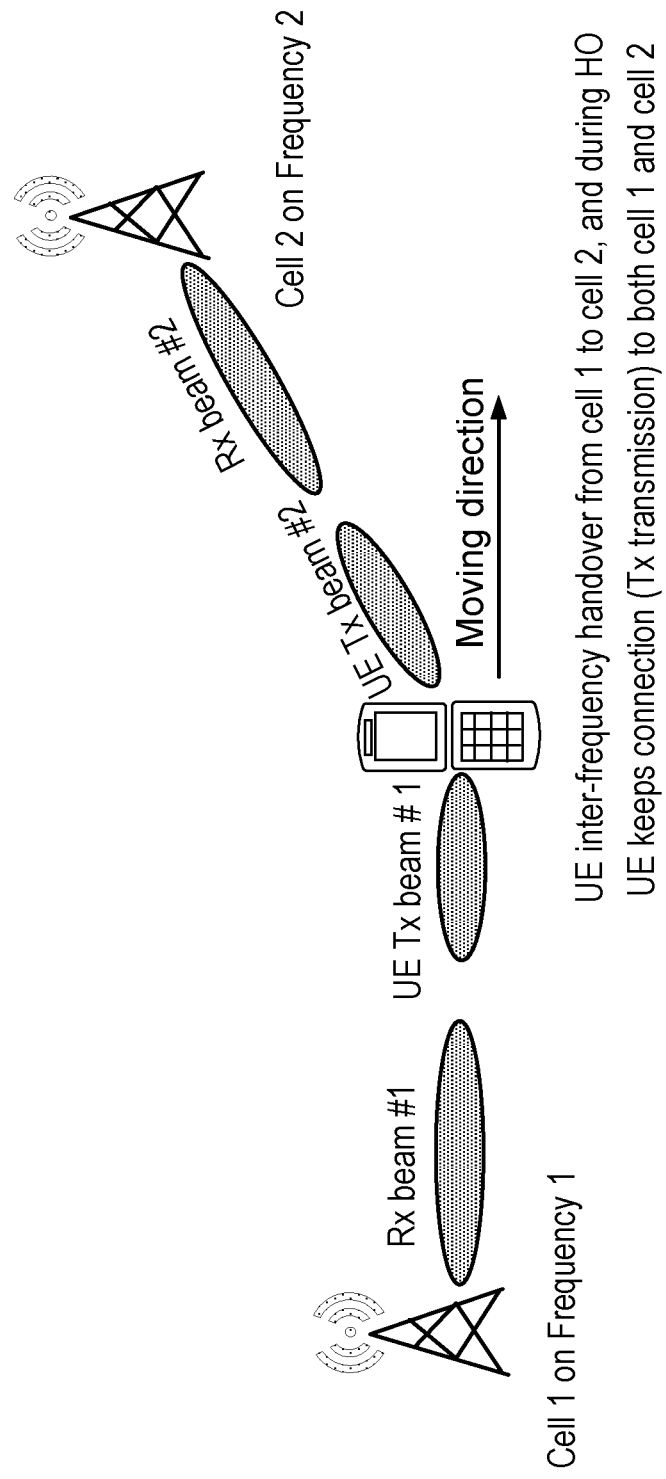
FIGS. 12a-d show four different handover scenarios that may be encountered at a user equipment (UE).
Figure 12B:
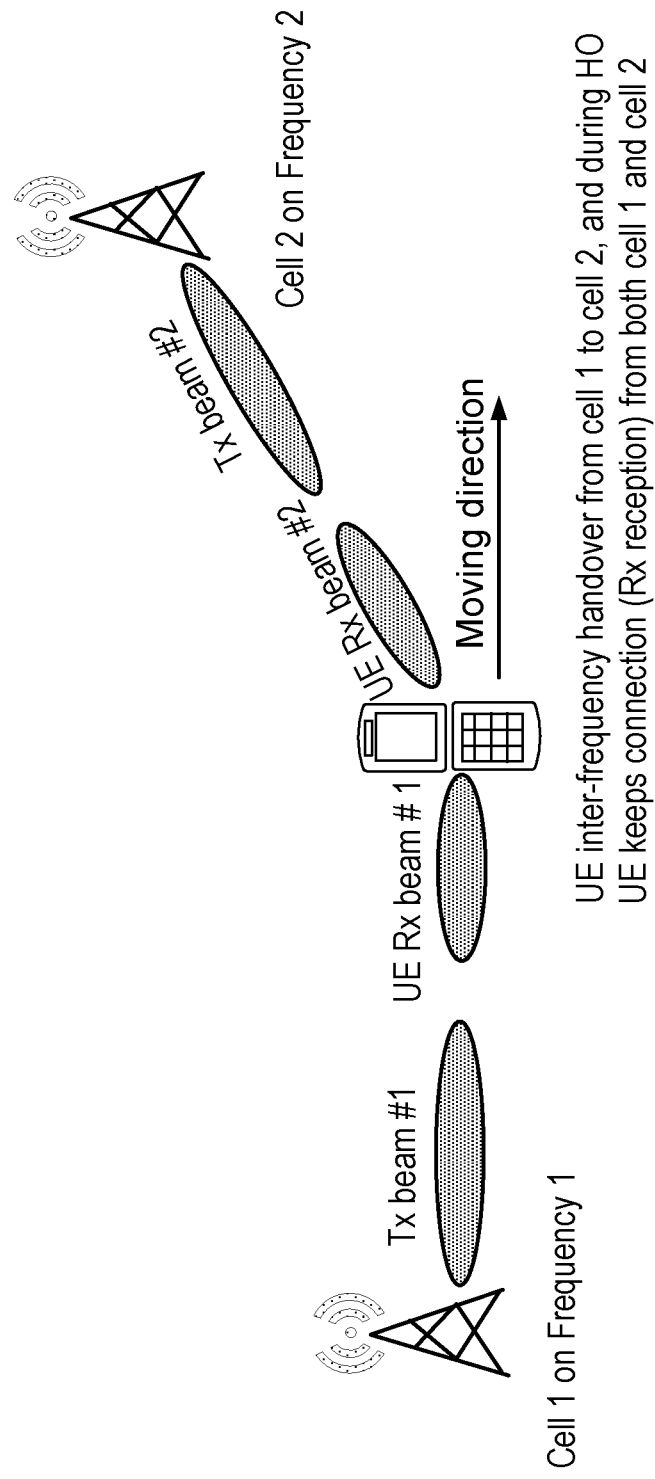
Figure 12C:
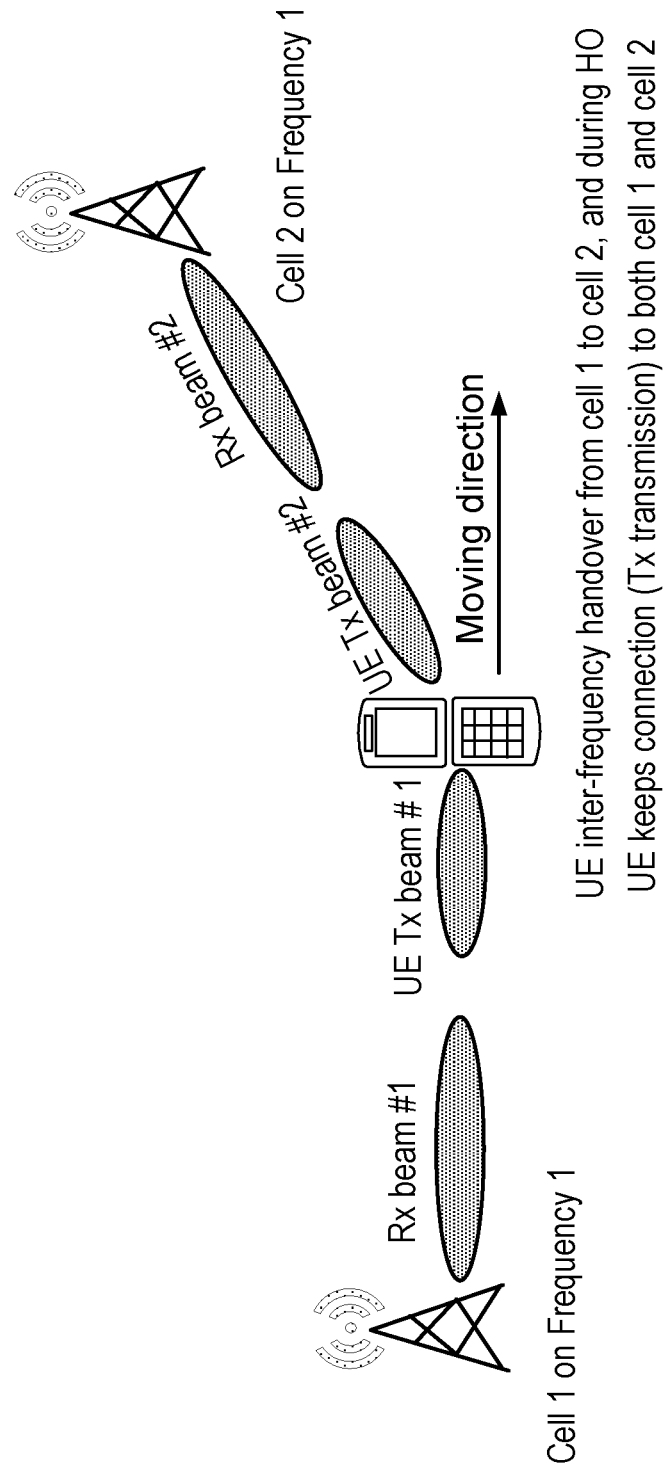
Figure 12D:
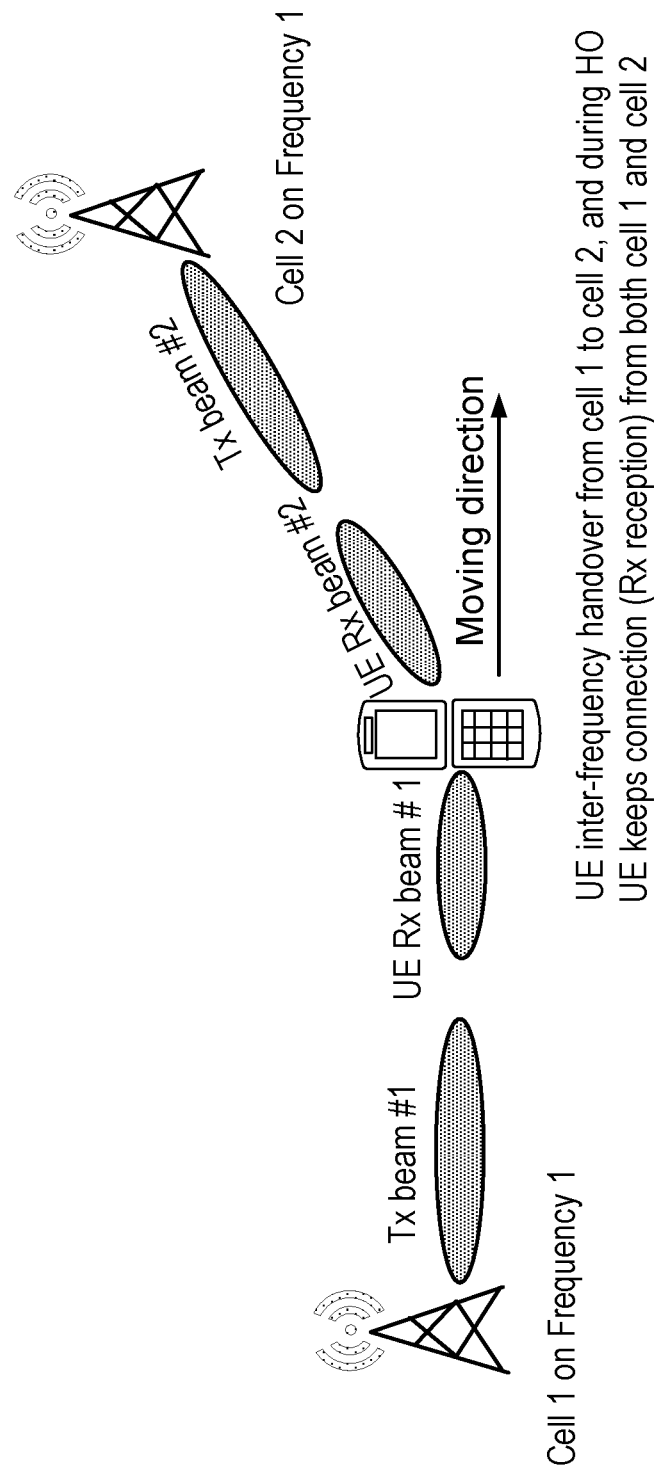

FIGS. 12a-d show four different handover scenarios that may be encountered at a user equipment (UE). FIG. 12a shows an inter-frequency handover scenario for simultaneous transmission (Tx) beams at the UE. For example, the UE may, for uplink (UL) transmissions to the network, be handed over from a source gNB, i.e. Cell 1, with which it has a connection on a first frequency band (e.g., FR1 or FR2) to a target gNB, i.e. Cell 2, with which it is establishing a connection on a second frequency band (e.g. the other one of FR1 or FR2). During handover, the UE maintains a Tx connection to both Cell 1 and Cell 2. FIG. 12b shows an inter-frequency handover scenario for simultaneous reception (Rx) beams at the UE. For example, the UE may, for downlink (DL) transmissions from the network, be handed over from a source gnB, i.e. Cell 1, with which it has a connection on a first frequency band (e.g., FR1 or FR2) to a target gNB, i.e. Cell 2, with which it is establishing a connection on a second frequency band (e.g. the other one of FR1 or FR2). During handover, the UE maintains an Rx connection to both Cell 1 and Cell 2. FIG. 12c shows an intra-frequency handover scenario for simultaneous transmission beams at the UE. For example, the UE may, for UL transmissions to the network, be handed over from a source gnB, i.e. Cell 1, with which it has a connection on a given frequency band (e.g., FR1 or FR2) to a target gNB, i.e. Cell 2, with which it is establishing a connection on the same frequency band (e.g. the same one of FR1 or FR2). During handover, the UE maintains a Tx connection to both Cell 1 and Cell 2. FIG. 12d shows an intra-frequency handover scenario for simultaneous Rx beams at the UE. For example, the UE may, for downlink (DL) transmissions from the network, be handed over from a source gnB, i.e. Cell 1, with which it has a connection on a given frequency band (e.g., FR1 or FR2) to a target gNB, i.e. Cell 2, with which it is establishing a connection on the same frequency band (e.g. the same one of FR1 or FR2). Although the Tx and Rx scenarios are shown separately, those skilled in the art will understand that Tx and Rx connections may occur simultaneously.

For all of the scenarios described above, UEs that support only a single active antenna panel have difficulties steering two beams at the same time, causing problems during simultaneous Tx/Rx on the UE side, especially when Cell 1 and Cell 2 are dislocated. One existing mitigation approach for simultaneous Rx scenarios (FIGS. 12b and 12d) may involve the UE using a wider beam for simultaneous Rx. However, a wide UE beam may not work well for simultaneous Tx scenarios involving FR2, due to the following two reasons.

Regarding the first reason, in FR2, a wide beam is achieved by switching off a number of activated antenna elements within the active antenna panel. For example, if 50% of antenna elements are switched off, 3 dB of Rx beamforming gain is lost. For Tx, 3 dB of maximal TRx (total radiated power) is lost in addition to the 3 dB of Tx beamforming gain that is lost, causing a 6 dB loss for a maximal EIRP (Equivalent Isotropically Radiated Power). Such unbalanced link budget for Tx and Rx may significantly degrade the handover performance. Thus, it may be desirable to avoid the use of a wide beam.

Regarding the second reason, in the scenario shown in FIG. 12c where an intra-frequency handover with simultaneous Tx is implemented on FR2 for a UE with only a single active antenna panel in use, the UE Tx streams, which are associated with different Cells, are transmitted from a same physical antenna. Very strong co-interferences among the simultaneous Tx streams may occur as a result, further degrading the handover performance.

The exemplary embodiments as described herein relate to beam transmission mechanisms to mitigate the aforementioned interference issues by using independent Tx streams for simultaneous streams to different network cells. This may increase the Tx performance in at least the following two ways. First, the UE may avoid the usage of a wide beam with the 6 dB of maximal EIRP loss discussed above. Instead, the UE configures independent narrow beams for different Tx polarizations. Second, the two simultaneous Tx streams from the UE are separated in the polarization domain (e.g., for linear polarization, V and H are separated by 90 deg), which can significantly reduce co-interferences among the Tx streams.

Figure 13:
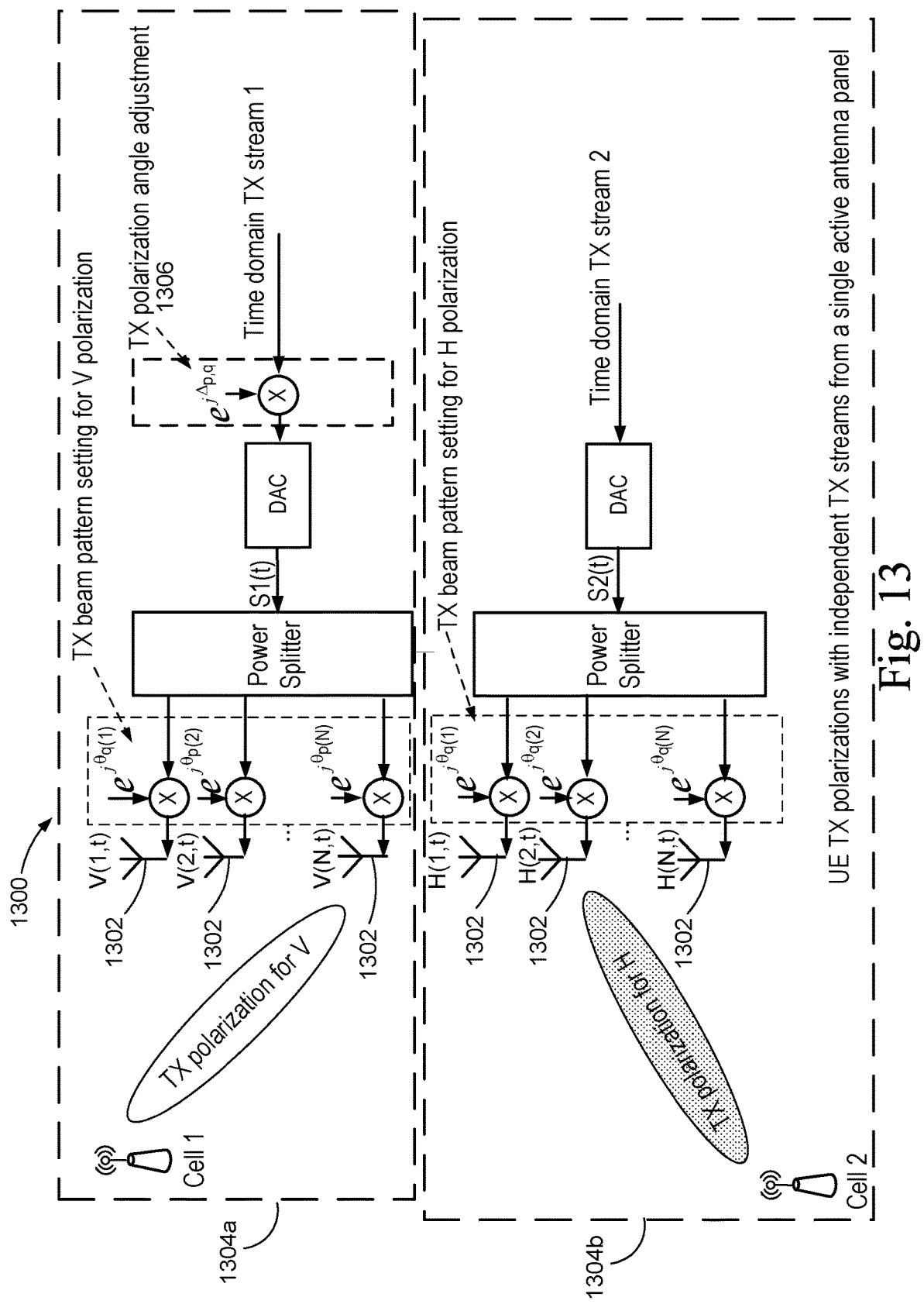
FIG. 13 shows an exemplary UE antenna panel and associated circuitry for transmitting data streams (beams) via beamforming to a plurality of network cells simultaneously.

FIG. 13 shows an exemplary UE antenna panel 1300 and associated circuitry for transmitting data streams (beams) via beamforming to a plurality of network cells simultaneously. The UE antenna panel 1300 is operable to transmit two Tx polarizations (V and H) via N antenna elements 1302. Although the antenna elements 1302 for propagating the V and H beams are drawn separately within the block diagram, in an actual physical circuitry layout each H element is co-located with a V element, i.e. the H and V beams are transmitted from the same antenna elements 1302. In this embodiment, V and H are two linear polarizations, which are by nature separated by 90 degrees.

According to the exemplary embodiments described herein, two independent Tx streams, each associated to a different network cell, are fed from UE baseband circuitry (not pictured) into two independent Tx polarization circuits, i.e. a first polarization circuit 1304a for generating the V beam and a second polarization circuit 1304b for generating the H beam, and beam-formed independently. $\overline{\theta}_p$ and $\overline{\theta}_q$ are two independent phase-shifted setting vectors for the V polarization and the H polarization, respectively, within the same UE antenna panel. $\overline{\theta}_p$ and $\overline{\theta}_q$ may be different values, resulting in different Tx beam patterns pointing to different network cells.

Additionally, the first polarization circuit 1304a includes an additional polarization angle adjustment 1306 for providing an additional phase offset $\Delta_{p,N}$ between V and H. The UE may use the additional phase offset to further adjust the angle difference between two Tx polarizations for further co-interference control. For example, the UE may adapt the setting $\Delta_{p,N}$ based on UL quality monitoring or UL interference estimations for the two simultaneous Tx streams.

The antenna panel 1300 further includes independent RF mixer circuits (not shown) for the two Tx polarizations (V and H) so that the respective beams may operate in different frequency layers. Thus, the exemplary antenna panel 1300 is also applicable to inter-frequency simultaneous Tx beam operation (e.g., FIG. 12a).

Various further mechanisms may be used to improve the performance of the simultaneous Tx streaming configuration described above.

Based on a particular UE RF capability, a single polarization transmission may have a limited maximal achieved transmit power. For example, the transmit power of a first single Tx polarization may have a maximal limit of 20 dBm that is lower than the 23 dBm maximal transmission power limit. However, the transmit power of a second single Tx polarization (being simultaneously transmitted to a different network cell in the manner described above) may have a maximal limit of 23 dBm and be transmitted at the maximal transmission power limit. In order to use a same transmission power for transmission power calculations for each of the Tx streams, according to one embodiment, the UE may apply a down-scaling of the maximal transmission power limit. For example, in the scenario described above, the UE may apply a 3 dB down-scaling of the maximal transmission power limit.

In another embodiment, during the period when UE is transmitting 2 independent Tx streams from two intra-panel Tx polarizations simultaneously, the network cell, e.g. gNB, may restrict the UL scheduling by scheduling UL channels with only a single port. In particular, for PUSCH (which is triggered by DCI format 0_1), the SRI within the DCI may be selected to point to a single port SRS resource.

In still another embodiment, when the UE is triggered by two different gNBs to transmit two independent TX streams in parallel, when at least one of the triggered Tx streams contains two Tx ports, the UE may apply a predefined priority handling rule to skip the transmission of one Tx stream while only transmitting the other Tx stream. For example, the skipping may be based on the number of ports of the stream. The UE may skip the transmission of the Tx stream with a single port, and then use dual-polarizations to transmit the remaining Tx stream having two ports. Alternatively, the UE may skip the transmission of a Tx stream with two ports, and then use the dual-polarizations to transmit the remaining Tx stream, which may have either one port or two ports. In one embodiment, the skipping rule may also be based on a channel type of the respective streams. For example, a PUSCH containing UCI bits may have a higher priority than a PUSCH without UCI bits. In another example, a PUCCH may have higher priority than a PUSCH. In still another example, a PUSCH may have a higher priority than an SRS.

Methods

The electronic device(s), network(s), system(s), chip(s) or component(s), or portions or implementations thereof, of FIG. 1-10 or 13, or some other figures herein, may be configured to perform one or more processes, techniques, or methods as described herein, or portions thereof.

Figure 14:
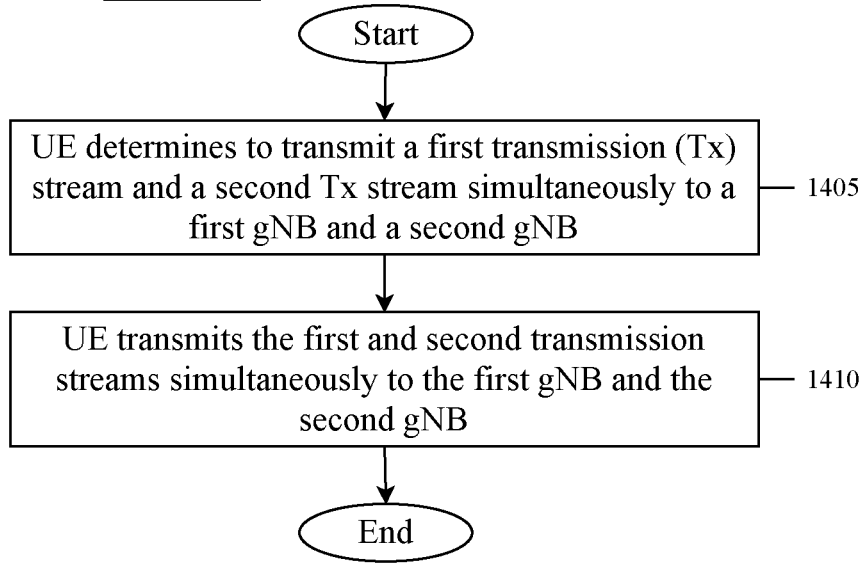
FIG. 14 shows a method for a UE simultaneously transmitting data streams to a plurality of network cells during handover.

FIG. 14 shows a method 1400 for a UE simultaneously transmitting data streams to a plurality of network cells during handover. In 1405, the UE determines to transmit a first transmission (Tx) stream and a second Tx stream simultaneously to a first gNB and a second gNB, wherein the first gNB is a serving gNB in a first cell and the second gNB is a handover target gNB in a second cell, for handing over communication with the UE from the first cell to the second cell. In 1410, the UE transmits the first and second transmission streams simultaneously to the first gNB and the second gNB by a first and second transmission polarization within a same antenna panel of the UE.

The operations described above may also be performed at a baseband circuitry, e.g. baseband circuitry 410 shown in FIG. 4, or at the hardware resources 500 shown in FIG. 5.

Figure 15:
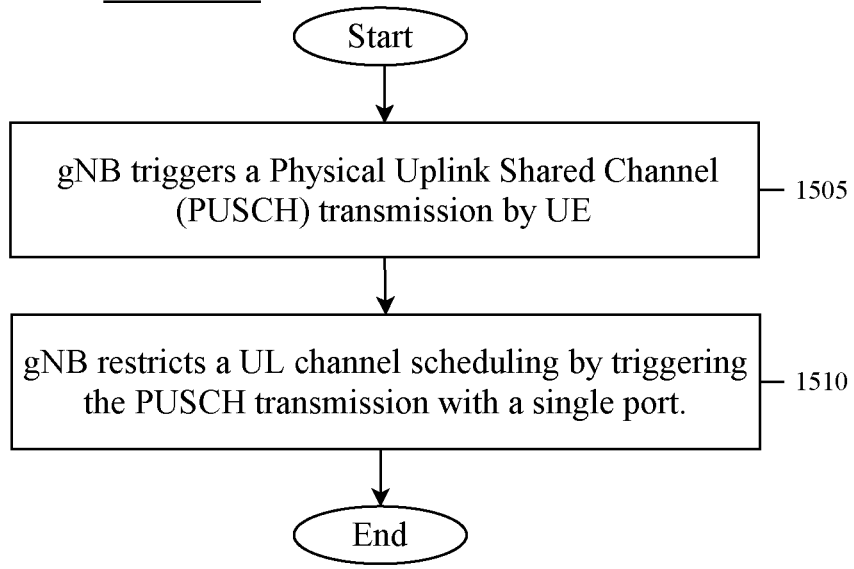
FIG. 15 shows a method for a gNB restricting an uplink (UL) channel scheduling for a UE simultaneously transmitting data streams to a plurality of network cells during handover.

FIG. 15 shows a method 1500 for a gNB restricting an uplink (UL) channel scheduling for a UE simultaneously transmitting data streams to a plurality of network cells during handover. In 1505, the gNB triggers a Physical Uplink Shared Channel (PUSCH) transmission by the UE. In 1510, the gNB restricts a UL channel scheduling by triggering the PUSCH transmission with a single port.

EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example 1 may include a method of operating a user equipment (UE), the method comprising: transmitting two distinct Tx streams simultaneously, by two distinct Tx polarization circuits within a same UE antenna panel circuitry.

Example 2 may include the method of example 1 or some other example herein, wherein the two Tx polarizations are configured with independent Tx beam patterns and each is associated with a different Rx beam pattern from one out of two different base stations.

Example 3 may include the method of examples 1 and 2 or some other example herein, wherein each of the Tx stream is associated one out of two different base stations.

Example 4 may include the method of example 1 or some other example herein, wherein each of the Tx streams can be associated with one Tx polarization.

Example 5 may include the method of example 1 or some other example herein, wherein each of the Tx streams can be associated with both TX polarizations.

Example 6 may include the method of examples 2 and 3 or some other example herein, wherein one of the base stations can be the serving base station while the other can be the handover targeting base station.

Example 7 may include the method of example 1 or some other example herein, wherein the UE calculates the transmission power for the two Tx streams separately, wherein for each calculated transmission power UE applies 3 dB down-scaling of the maximal transmission power limit.

Example 8 may include the method of example 1 or some other example herein, wherein the UE further determines a phase offset setting between the two Tx polarizations based on UL interference measurements.

Example 9 may include the method of example 6 or some other example herein, wherein the base station restricts the UL channel scheduling by triggering the UL transmission with only a single port.

Example 10 may include the method of example 9 or some other example herein, wherein the base station allocates a DCI format 0_1 to trigger a PUSCH transmission by the UE, wherein the SRI within the DCI is selected to be associated with a single port SRS resource.

Example 11 may include a method of operating a user equipment (UE), the method comprising: triggering the UE by two different base stations to transmit two Tx streams simultaneously, wherein one of the triggered Tx stream contains two ports: the UE skips the transmission of one of the TX streams based on a pre-defined rule.

Example 12 may include the method of example 11 or some other example herein, wherein the pre-defined rule can be based on the port number of a triggered Tx stream.

Example 13 may include the method of example 11 or some other example herein, wherein the pre-defined rule can be based on the channel type of a triggered Tx stream.

Example 14 may include a method for a user equipment (UE) in a wireless network including a first next generation NodeB (gNB) and a second gNB to communicate with the UE, the method comprising: determining to transmit two transmission (TX) streams simultaneously to the first gNB and the second gNB, wherein the first gNB is a serving gNB in a first cell and the second gNB is a handover target gNB in a second cell for handing over communication with the UE from the first cell to the second cell; and transmitting the two transmission streams simultaneously to the first gNB and the second gNB by two transmission polarizations within a same antenna panel of the UE.

Example 15 may include the method of example 14 and/or some other example herein, wherein the determining to transmit two transmission streams is triggered by the first gNB and the second gNB.

Example 16 may include the method of example 14 and/or some other example herein, wherein the UE supports only a single active antenna panel.

Example 17 may include the method of example 14 and/or some other example herein, wherein the first gNB or the second gNB contains two ports.

Example 18 may include the method of example 14 and/or some other example herein, wherein the two transmission streams are in frequency range FR2.

Example 19 may include the method of example 14 and/or some other example herein, wherein the handing over the communication with the UE from the first cell to the second cell is an intra-frequency handover or an inter-frequency handover.

Example 20 may include the method of example 14 and/or some other example herein, wherein the first cell and the second cell are dis-located.

Example 21 may include the method of example 14 and/or some other example herein, wherein the two transmission streams are transmitted by two different Tx polarization circuities within a same antenna panel circuitry of the UE.

Example 22 may include the method of example 14 and/or some other example herein, further comprising: calculating a transmission power for the two Tx streams separately; and applying 3 dB power down-scaling of the transmission power for each of the two Tx streams.

Example 23 may include the method of example 14 and/or some other example herein, wherein the two Tx polarizations are configured with independent Tx beam patterns, each Tx beam pattern is associated with a different receiving (Rx) beam pattern from the first gNB and the second gNB.

Example 24 may include the method of example 14 and/or some other example herein, further comprising: determining a phase offset setting between the two Tx polarizations based on uplink (UL) interference measurements.

Example 25 may include the method of example 14 and/or some other example herein, wherein one of the two Tx streams contain to two Tx ports, and the method further comprising: applying a pre-defined priority handling rule to skip transmission of a Tx stream while only transmit another Tx steam.

Example 26 may include the method of example 25 and/or some other example herein, wherein the UE is to skip transmission of a Tx stream based on a port number of the Tx stream.

Example 27 may include the method of example 25 and/or some other example herein, wherein the UE is to skip transmission of a Tx stream based on a channel type of the Tx stream.

Example 28 may include the method of any of the examples 14-27 and/or some other example herein, wherein the method is performed by an apparatus that is implemented in or employed by the UE.

Example 29 may include a method for a next generation NodeB (gNB) in a wireless network including the gNB as a first gNB in a first cell and a second gNB in a second cell to communicate with a user equipment (UE), the method comprising: triggering a Physical Uplink Shared Channel (PUSCH) transmission by the UE; and restricting a uplink (UL) channel scheduling by triggering the PUSCH transmission with a single port.

Example 30 may include the method of example 29 and/or some other example herein, further comprising: allocating a Downlink Control Information (DCI) format 0_1 for triggering the PUSCH transmission by the UE.

Example 31 may include the method of example 30 and/or some other example herein, wherein a SRI within the DCI is selected to be associated with a single port Sounding Reference Signal (SRS) resource.

Example 32 may include the method of example 30 and/or some other example herein, further comprising: receiving a transmission (Tx) stream from the UE, wherein the Tx stream is one of two transmission streams simultaneously sent to the first gNB and the second gNB by two transmission polarizations within a same antenna panel of the UE.

Example 33 may include the method of example 32 and/or some other example herein, wherein the first gNB or the second gNB contains two ports.

Example 34 may include the method of example 32 and/or some other example herein, wherein the two transmission streams are in frequency range FR2.

Example 35 may include the method of example 32 and/or some other example herein, wherein the first cell and the second cell are dis-located.

Example 36 may include the method of example 29-35 and/or some other example herein, wherein the method is performed by an apparatus that is implemented in or employed by the gNB.

Example 37 may include an apparatus comprising means to perform one or more elements of a method described in or related to any of examples 1-36, or any other method or process described herein.

Example 38 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 39 may include an apparatus comprising logic, modules, or circuitry to perform one or more elements of a method described in or related to any of examples 1-36, or any other method or process described herein.

Example 40 may include a method, technique, or process as described in or related to any of examples 1-36, or portions or parts thereof.

Example 41 may include an apparatus comprising: one or more processors and one or more computer-readable media comprising instructions that, when executed by the one or more processors, cause the one or more processors to perform the method, techniques, or process as described in or related to any of examples 1-36, or portions thereof.

Example 42 may include a signal as described in or related to any of examples 1-36, or portions or parts thereof.

Example 43 may include a datagram, packet, frame, segment, protocol data unit (PDU), or message as described in or related to any of examples 1-36, or portions or parts thereof, or otherwise described in the present disclosure.

Example 44 may include a signal encoded with data as described in or related to any of examples 1-36, or portions or parts thereof, or otherwise described in the present disclosure.

Example 45 may include a signal encoded with a datagram, packet, frame, segment, protocol data unit (PDU), or message as described in or related to any of examples 1-36, or portions or parts thereof, or otherwise described in the present disclosure.

Example 46 may include an electromagnetic signal carrying computer-readable instructions, wherein execution of the computer-readable instructions by one or more processors is to cause the one or more processors to perform the method, techniques, or process as described in or related to any of examples 1-36, or portions thereof.

Example 47 may include a computer program comprising instructions, wherein execution of the program by a processing element is to cause the processing element to carry out the method, techniques, or process as described in or related to any of examples 1-36, or portions thereof.

Example 48 may include a signal in a wireless network as shown and described herein.

Example 49 may include a method of communicating in a wireless network as shown and described herein.

Example 50 may include a system for providing wireless communication as shown and described herein.

Example 51 may include a device for providing wireless communication as shown and described herein.

Any of the above-described examples may be combined with any other example (or combination of examples), unless explicitly stated otherwise. The foregoing description of one or more implementations provides illustration and description but is not intended to be exhaustive or to limit the scope of embodiments to the precise form disclosed. Modifications and variations are possible in light of the above teachings or may be acquired from practice of various embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
at a user equipment (UE) in a wireless network including a first next generation NodeB (gNB) and a second gNB for communicating with the UE:
determining to transmit a first transmission (Tx) stream and a second Tx stream simultaneously to the first gNB and the second gNB for handing over communication with the UE from a first cell to a second cell, wherein the first gNB is a serving gNB in the first cell and the second gNB is a handover target gNB in the second cell; and
simultaneously transmitting within a same antenna panel of the UE the first transmission stream to the first gNB using a first polarization and the second transmission stream to the second gNB using a second polarization different from the first polarization.

2. The method of claim 1, wherein each of the first and second Tx polarizations are configured with independent Tx beam patterns and associated with different Rx beam patterns from one of the first or second gNBs.

3. The method of claim 1, further comprising:
calculating a transmission power for each of the first and second Tx streams separately, wherein, for each calculated transmission power, the UE applies a 3 dB down-scaling of a maximal transmission power limit.

4. The method of claim 1, further comprising:
determining a phase offset setting between the first and second Tx polarizations based on UL interference measurements.

5. The method of claim 1, wherein one of the first or second gNB restrict an uplink (UL) channel scheduling by triggering a UL transmission with only a single port.

6. The method of claim 5, wherein the one of the first or second gNB allocates a DCI format 0_1 to trigger a PUSCH transmission by the UE.

7. The method of claim 1, further comprising:
skipping a transmission of one of the first or second Tx streams based on a predefined rule, wherein the predefined rule is based on a channel type of one of the first or second Tx streams.

8. The method of claim 1, wherein the handing over the communication with the UE from the first cell to the second cell is one of an intra-frequency handover or an inter-frequency handover.

9. The method of claim 1, wherein the first cell and the second cell are dis-located.

10. A user equipment (UE), comprising:
a plurality of antenna panels, each antenna panel comprising a plurality of antenna elements;
a processor configured to determine to transmit a first transmission (Tx) stream and a second Tx stream simultaneously to a first next generation NodeB (gNB) and a second gNB for handing over communication with the UE from a first cell to a second cell, wherein the first gNB is a serving gNB in the first cell and the second gNB is a handover target gNB in the second cell; and
a transceiver configured to simultaneously transmit via a same antenna panel of the UE the first transmission stream to the first gNB using a first TX polarization and the second transmission stream to the second gNB using a second TX polarization different from the first Tx polarization.

11. The UE of claim 10, wherein the UE supports only a single active antenna panel.

12. The UE of claim 10, wherein the transceiver comprises a plurality of Tx polarization circuities and the first and second transmission streams are transmitted by different Tx polarization circuities.

13. The UE of claim 10, wherein each of the first and second Tx polarizations are configured with independent Tx beam patterns and associated with different Rx beam patterns from one of the first or second gNBs.

14. The UE of claim 10, wherein the processor is further configured to calculate a transmission power for each of the first and second Tx streams separately, wherein, for each calculated transmission power, the UE applies a 3 dB down-scaling of a maximal transmission power limit.

15. A method, comprising:
at a first next generation NodeB (gNB) in a first cell for communicating with a user equipment (UE) in a wireless network including the UE and a second gNB in a second cell for communicating with the UE:
allocating a Downlink Control Information (DCI) format 0_1 for triggering a Physical Uplink Shared Channel (PUSCH) transmission by the UE;
triggering the PUSCH transmission by the UE;
receiving a transmission (Tx) stream from the UE, wherein the Tx stream is a first transmission (Tx) stream using a first polarization or a second Tx stream using a second polarization simultaneously sent to the first gNB and the second gNB within a same antenna panel of the UE; and restricting an uplink (UL) channel scheduling by triggering the PUSCH transmission with a single port.

16. The method of claim 15, wherein an SRI within the DCI is selected to be associated with a single port Sounding Reference Signal (SRS) resource.

17. The method of claim 16, wherein the first gNB or the second gNB contains two ports.

18. The method of claim 15, wherein the first Tx stream and the second Tx stream are in frequency range FR2.

19. The method of claim 15, wherein the first cell and the second cell are dislocated.

* * * * *